United States Patent

Ishida et al.

Patent Number: 5,878,161
Date of Patent: Mar. 2, 1999

[54] IMAGE PROCESSING USING VECTOR DATA TO REDUCE NOISE

[75] Inventors: Yoshihiro Ishida; Akihiro Katayama; Junichi Yamakawa, all of Kawasaki, Japan

[73] Assignee: Canon Kabushiki Kaisha, Tokyo, Japan

[21] Appl. No.: 442,560

[22] Filed: May 16, 1995

Related U.S. Application Data

[63] Continuation of Ser. No. 995,038, Dec. 22, 1992, abandoned.

[30] Foreign Application Priority Data

Dec. 26, 1991 [JP] Japan .................................. 3-345062

[51] Int. Cl.$^6$ .................................................. G06K 9/00
[52] U.S. Cl. ...................... 382/198; 382/256; 345/144; 345/130; 345/136; 358/447; 358/448; 358/451
[58] Field of Search .................................. 382/199, 200, 382/256, 266, 269, 276, 298, 301; 358/447, 448, 451, 455; 345/130, 136, 144; 395/139

[56] References Cited

U.S. PATENT DOCUMENTS

| | | | |
|---|---|---|---|
| 4,331,955 | 5/1982 | Hansen | 340/728 |
| 4,817,172 | 3/1989 | Cho | 382/256 |
| 4,918,542 | 4/1990 | Nagashima et al. | 358/451 |
| 4,956,869 | 9/1990 | Miyatake et al. | |
| 5,042,075 | 8/1991 | Sato | 382/47 |
| 5,073,960 | 12/1991 | Nakai et al. | 382/22 |
| 5,093,870 | 3/1992 | Watanabe | 358/451 |
| 5,131,058 | 7/1992 | Ting et al. | 382/298 |
| 5,142,592 | 8/1992 | Moler | 382/200 |
| 5,200,840 | 4/1993 | Koike et al. | 358/451 |
| 5,222,158 | 6/1993 | Takasaki et al. | 382/44 |

FOREIGN PATENT DOCUMENTS

| | | | |
|---|---|---|---|
| 215664 | 3/1987 | European Pat. Off. | G09G 1/16 |
| 60-022280 | 2/1985 | Japan | G06F 15/72 |
| 3215893 | 9/1991 | Japan | G09G 5/26 |

Primary Examiner—Wellington Chin
Assistant Examiner—Jean B. Corrielus
Attorney, Agent, or Firm—Fitzpatrick, Cella, Harper & Scinto

[57] ABSTRACT

In an image processing method, contours of an image are represented in the form of vector coordinates, and calculation processing is performed based on the vector coordinate representation. In the method, noise present within the original image from which the vector coordinates are extracted is removed in the form of vector data.

21 Claims, 32 Drawing Sheets

FIG.4
EXAMPLE OF COARSE-CONTOUR VECTOR LOOP REPRESENTING IMAGE
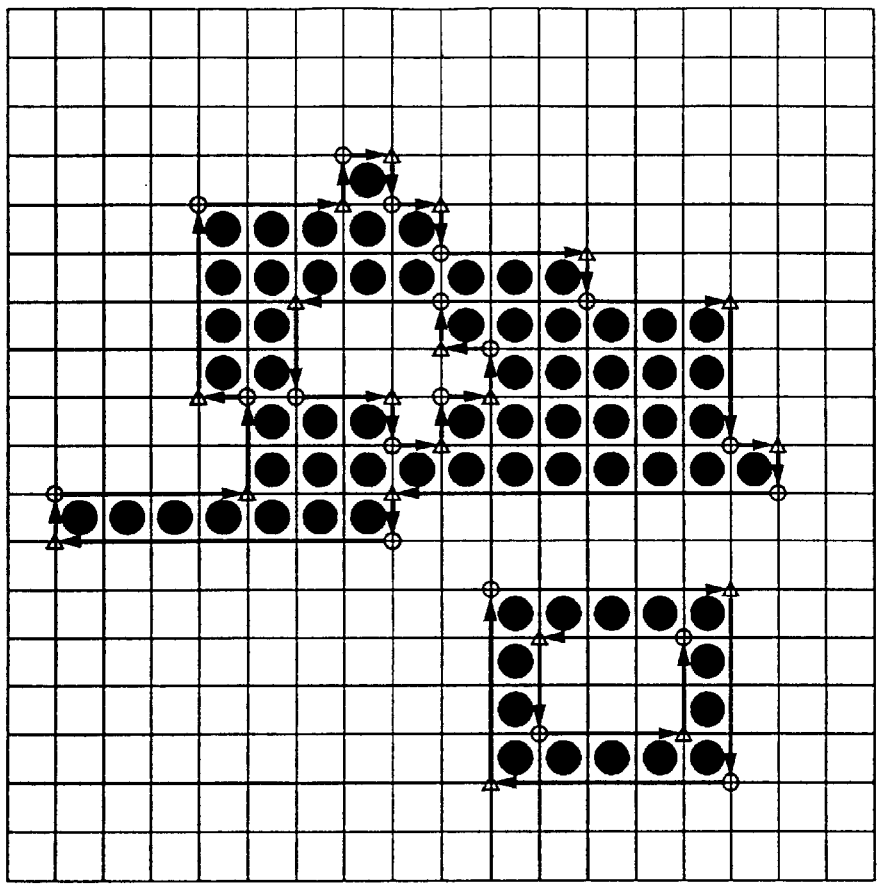
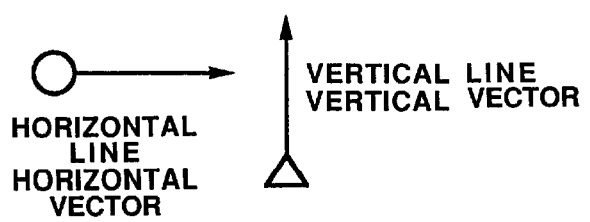

|Di-1|=1 & |Di+1|≧2          |Di-2| ≦ |Di|

|Di-1|≧2  &  |Di+1|=1

|Di| ≧ |Di+2|

|Di-1|≧2  &  |Di|≧ 3

$|Di| > |Di-2| + |Di+2|$ $(|Di-1| = |Di+1| = 1)$

IMAGE PROCESSING USING VECTOR DATA TO REDUCE NOISE

This application is a continuation of application Ser. No. 07/995,038, filed Dec. 22, 1992, now abandoned.

BACKGROUND OF THE INVENTION

1. Field of the Invention

This invention relates to smoothing processing of outline-vector data or magnification-varying processing of a digital binary image, and more particularly, to an image processing method and apparatus for obtaining high-quality outline data or a high-quality image subjected to magnification-varying processing using contour informaton.

2. Description of the Related Art

The above-described technique has been used as a technique for producing digital fonts (a typeface) used in DTP (desktop publishing) apparatuses, word processors and the like.

The technique is used for automatically extracting rough contour data in a system of editing and forming outline fonts. That is, predrawn large-format (analog) characters are read by a digital scanner, and rough contour data are automatically extracted based on bit-map data of digitized large-format characters, each of which comprises at least about several hundreds of pixels (picture elements)×several hundreds of pixels. A font designer forms final outline characters by performing correction while comparing bit-map data of such large-format characters of an original with rough contour data on a display.

On the other hand, a technique has, for example, been proposed in which high-quality vectorized fonts are completely automatically formed at high speed from dot characters, each of which comprises rather small dots of, for example, about 48 dots×48 dots (Murayama and Watanabe, "Automatically Improved Vectorized Fonts", Preprint of National Meeting of Gazo Denshi Gakkai (The Japan Society of Image Electronics) 27, pp. 117–120 (1988)).

An SCP (selective processing conversion) method (see Matsumoto and Kobayashi, "A Study of Evaluation of Picture Quality in Resolution Conversion in a Facsimile", *Gazo Denshi Gakkai Shi (Journal of Japan Society of Image Electronics)*, vol. 12, no. 5, pp. 354–362 (1983)), in which each pixel in an original image is repeatedly used a number of times equal to the desired magnification or is periodically skipped in accordance with varying magnification, has generally been used for magnification-varying processing of a digital binary image. However, since this method has problems in picture quality such that, for example, oblique-line portions have a stepwise shape, various other methods have been proposed, such as a smoothing method which works by referring to a pattern of pixels surrounding a target pixel (Imanaka, Semasa and Ono, "Provision of High Picture Quality by Smoothing Processing of a Received Image in a Facsimile", Preprint of Annual Meeting of Gazo Denshi Gakkai (Japan Society of Image Electronics), no. 18 (1991)), a projection method in which an original image is projected onto a conversion image surface having different line density, and the values of pixels of the converted image are determined by performing binary-coding processing of integrated values relating to respective pixels within this surface using threshold logic (Arai and Yasuda, "A Study of Line-Density Conversion in a Facsimile", *Gazo Denshi Gakkai Shi (Journal of Japan Society of Image Electronics)*, vol. 7, no. 1, pp. 11–18 (1978)), and the like.

As described above, in the field of DTP, a method has generally been used in which digital fonts (a typeface) are stored in coordinate representation, and are subjected to dot development after changing magnification of stored coordinate values in accordance with desired magnification.

Problems in the above-described known technique will now be considered.

The outline-vector smoothing method in the system of editing and forming outline fonts is a method of roughly reducing the size of a character in which vectorization is performed based on the diagram of the character comprising a very large number of dots. Hence, contours of lines having a one-dot width or a two-dot width, and of fine points or holes comprising a small number of dots, i.e., about a few dots, will not be extracted or will be smoothed over. Therefore, such a method is not suitable for forming outline-vector data of fine-line images or complicated images, from the viewpoint of accuracy and picture quality. Furthermore, a considerable amount of calculation is required for smoothing processing, and therefore real-time calculation cannot be expected if an inexpensive computer system is used.

In the method of automatically forming high-quality vector fonts from dot characters comprising a small number of dots with high speed, beautifully shaped dot fonts are assumed as input fonts. Therefore, consideration is not taken for processing for noise, such as notches, isolated points and the like, which will be produced in an image read by a scanner or the like. The method also has the problem that smoothing processing is performed even on fine information having a one-dot width, and therefore fine features in the image are lost.

The smoothing method which works by referring to a pattern of pixels surrounding a target pixel has the problem that the target pixel can be processed only by a fixed magnification of two or four times in the main-scanning direction and the sub-scanning direction. The projection method has the problem that effective magnification is limited to ½ to two times, and high picture quality cannot be expected when the range of magnification is expanded to other values.

The method of obtaining character diagrams subjected to magnification-varying processing by extracting outline vectors from bit-map fonts uses only bit-map fonts as input data, and assumes that information relating to the properties of an input image, such as typeface information (Ming-dynasty characters, Gothic characters, katakana, hiragana or the like) or the like, is provided as additional information. Furthermore, this method cannot deal with noise, such as notches, isolated points and the like, contained in an input image, and fine information having a one-pixel width. Hence, it is not suitable to apply this method to a general binary image.

SUMMARY OF THE INVENTION

The present invention provides an image processing method which can be applied even to outline vectors obtained from an image having a complicated structure and noise, which is produced by reading, for example, a line drawing such as a weather chart, a business document, or the like, by an image reader or the like with a relatively small amount of calculation, by determining a target outline vector after smoothing processing in accordance with a pattern of a target outline vector and outline vectors near the target outline vector, and introducing a rule for determining whether a fine structure having a one-dot width must be removed as noise, must be preserved as a salient point without being subjected to smoothing processing, or must be made to be a point on a smooth contour by performing smoothing processing.

It is an object of the present invention to obtain a digital binary image having high picture quality subjected to magnification-varying processing with a desired (arbitrary) magnification, by extracting outline vectors from a binary image, forming outline vectors subjected to smooth magnification-varing processing with the desired (arbitrary) magnification in a state of representation of the extracted outline vectors, and restructuring a binary image from the outline vectors subjected to the smooth magnification-varying processing.

BRIEF DESCRIPTION OF THE DRAWINGS

FIG. 2 through 4 are diagrams illustrating a method of extracting outlines from a raster-scanning-type binary image;

DESCRIPTION OF THE PREFERRED EMBODIMENTS

Figure 1:
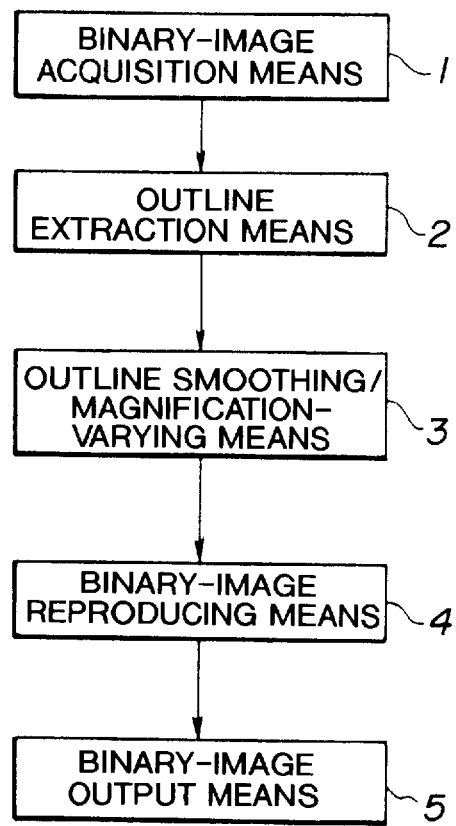
FIG. 1 is a diagram illustrating a binary-image processing apparatus according to an embodiment of the present invention.

FIG. 1 is a diagram which most properly represents the characteristics of the present invention. In FIG. 1, binary-image acquisition means 1 acquires a digital binary image to be subjected to magnification-varying processing, and outputs a raster-scanning-type binary image. Outline extraction means 2 extracts coarse contour vectors (outline vectors before performing smoothing and magnification-varying processing) from the raster-scanning-type binary image. Outline smoothing/magnification-varying means 3 performs smoothing and magnification-varying processing of the data of the coarse contour vectors in the form of vector data. Binary-image reproducing means 4 reproduces raster-scanning-type binary image data from the outline vector data representing the binary image. Binary-image output means 5 displays the raster-scanning-type binary image data, provides a hard copy of an image represented by the data, or outputs the data to a communication channel or the like.

Binary-image acquisition means 1 comprises, for example, a known raster-scanning-type binary image output apparatus in which an image is read by an image reader, is subjected to binary-coding processing, and is output in the form of raster scanning. Outline extraction means 2 comprises, for example, an apparatus described in Japanese Patent Application No. 2-281958, filed Oct. 22, 1990 by the assignee of the present application.

Figure 2:
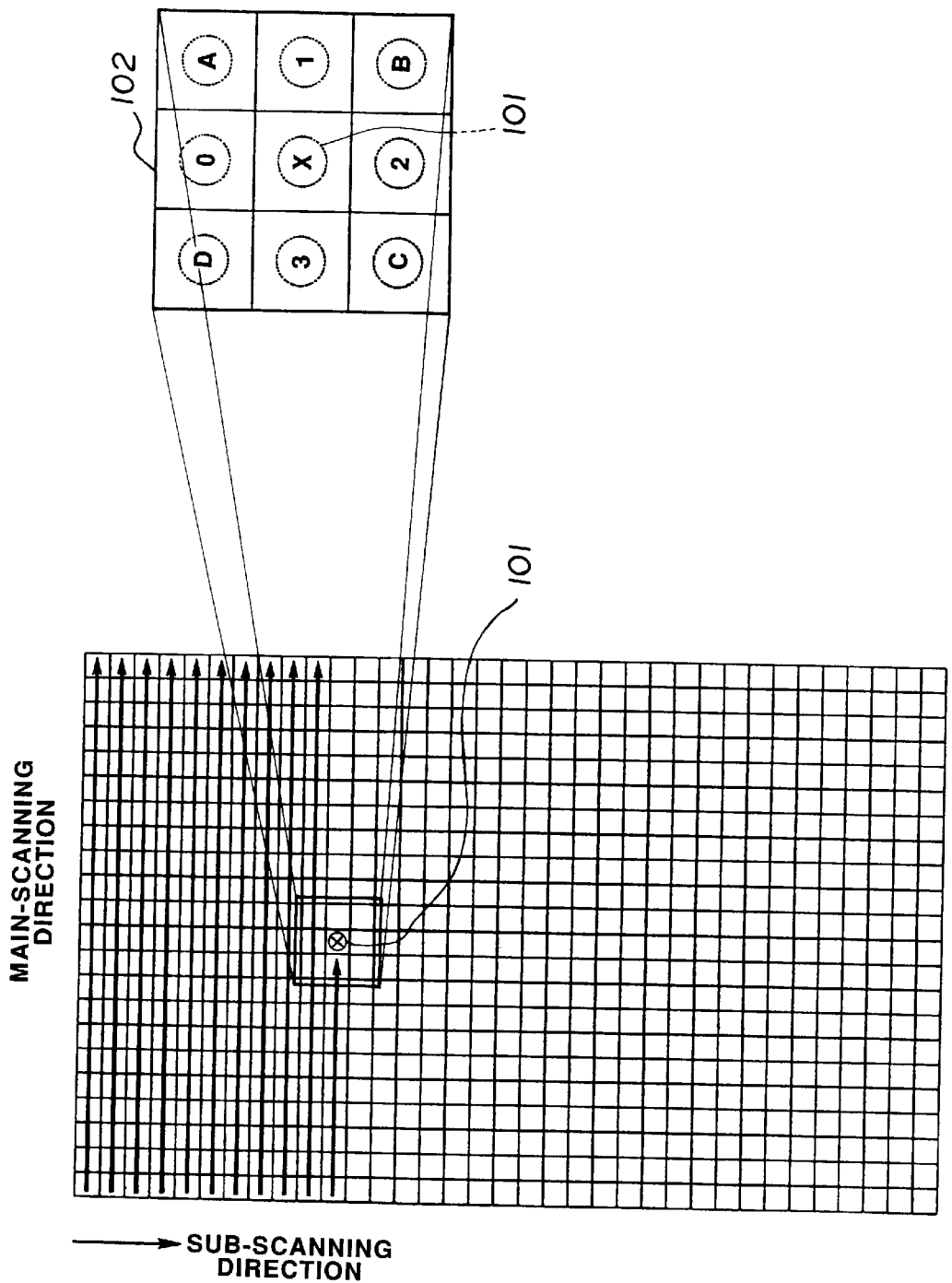
Figure 3:
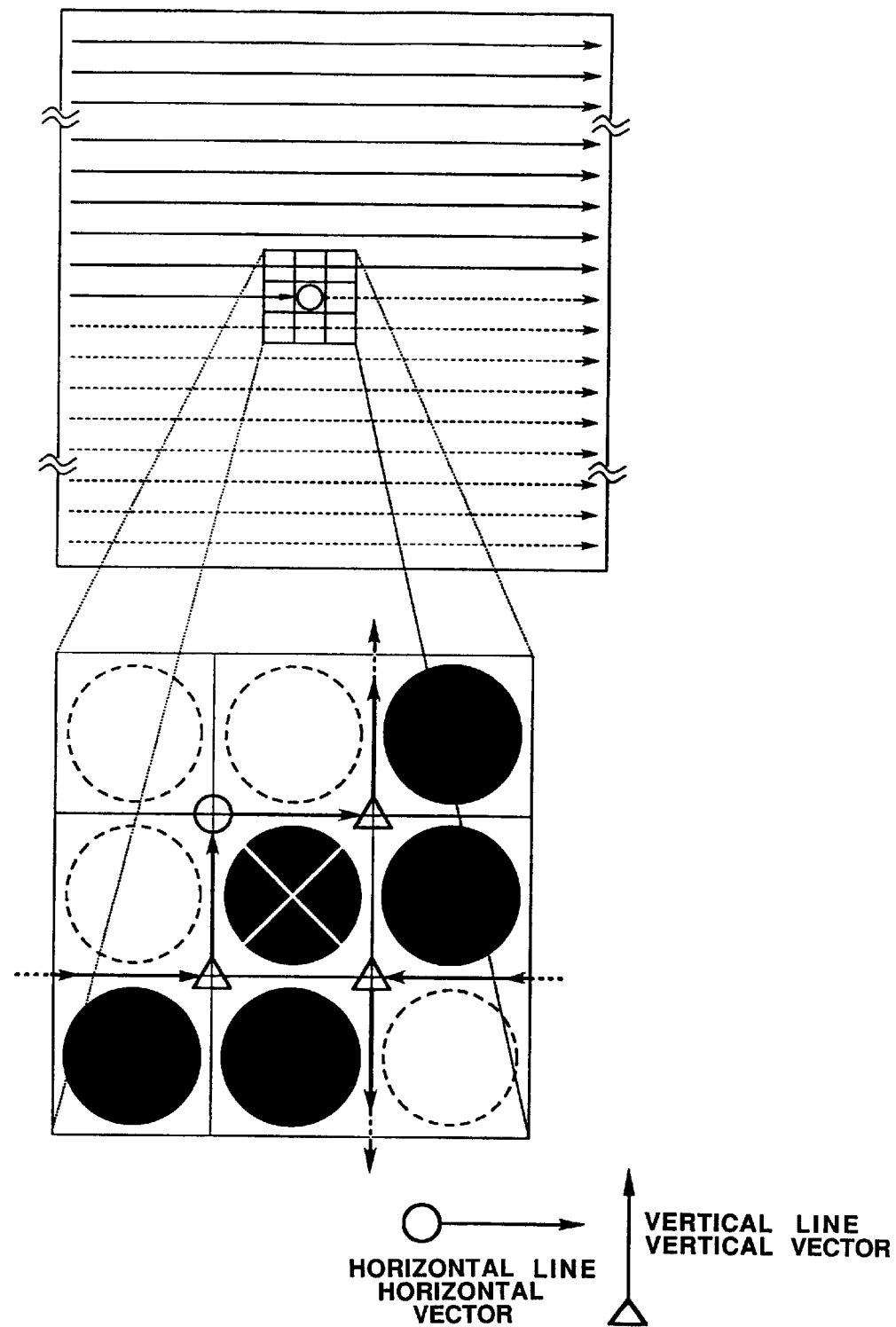

FIG. 2 illustrates a method of scanning raster-scanning-type binary image data output from binary image acquisition means 1, and also illustrates a method of scanning raster-scanning-type binary image data input to outline extraction means 2. In the form shown in FIG. 2, binary image data output from binary-image acquisition means 1 are input to outline extraction means 2. In FIG. 2, reference numeral 101 represents a pixel in a binary image being subjected to raster scanning, and reference numeral 102 represents a nine-pixel region including eight pixels surrounding pixel 101. Outline extraction means 2 described in Japanese Patent Application No. 2-281958 (1990) selects a target pixel in the sequence of raster scanning, and detects each contour edge vector (a horizontal vector or a vertical vector) present between the target pixel and a pixel adjacent to the target pixel in accordance with the state (white pixel or black pixel) of each pixel in nine-pixel region 102. If a contour edge vector is present, outline extraction means 2 extracts the data of the coordinates of the start point and the direction of the edge vector, and extracts coarse contour vectors while updating the connection relationship between edge vectors. FIG. 3 illustrates a state of extracting each contour edge vector between a target pixel and a pixel adjacent to the target pixel. In FIG. 3, each mark Δ represents the start point of a vertical vector, and each mark ○ represents the start point of a horizontal vector. FIG. 4 illustrates coarse contour vector loops extracted by the outline extraction means. Each area sectioned by lattices indicates the position of a pixel of an input image. A blank area represents a white pixel, and an area filled with a dot represents a black pixel. As in FIG. 3, each mark Δ represents the start point of a vertical vector, and each mark ○ represents the start point of a horizontal vector. As can be understood from FIG. 4, the outline extraction means extracts a region in which black pixels are connected together as a coarse contour vector loop in which horizontal vectors and vertical vectors alternately continue. A vector is extracted so that the right side of the direction of movement of the vector corresponds to a black-pixel region.

Figure 5:
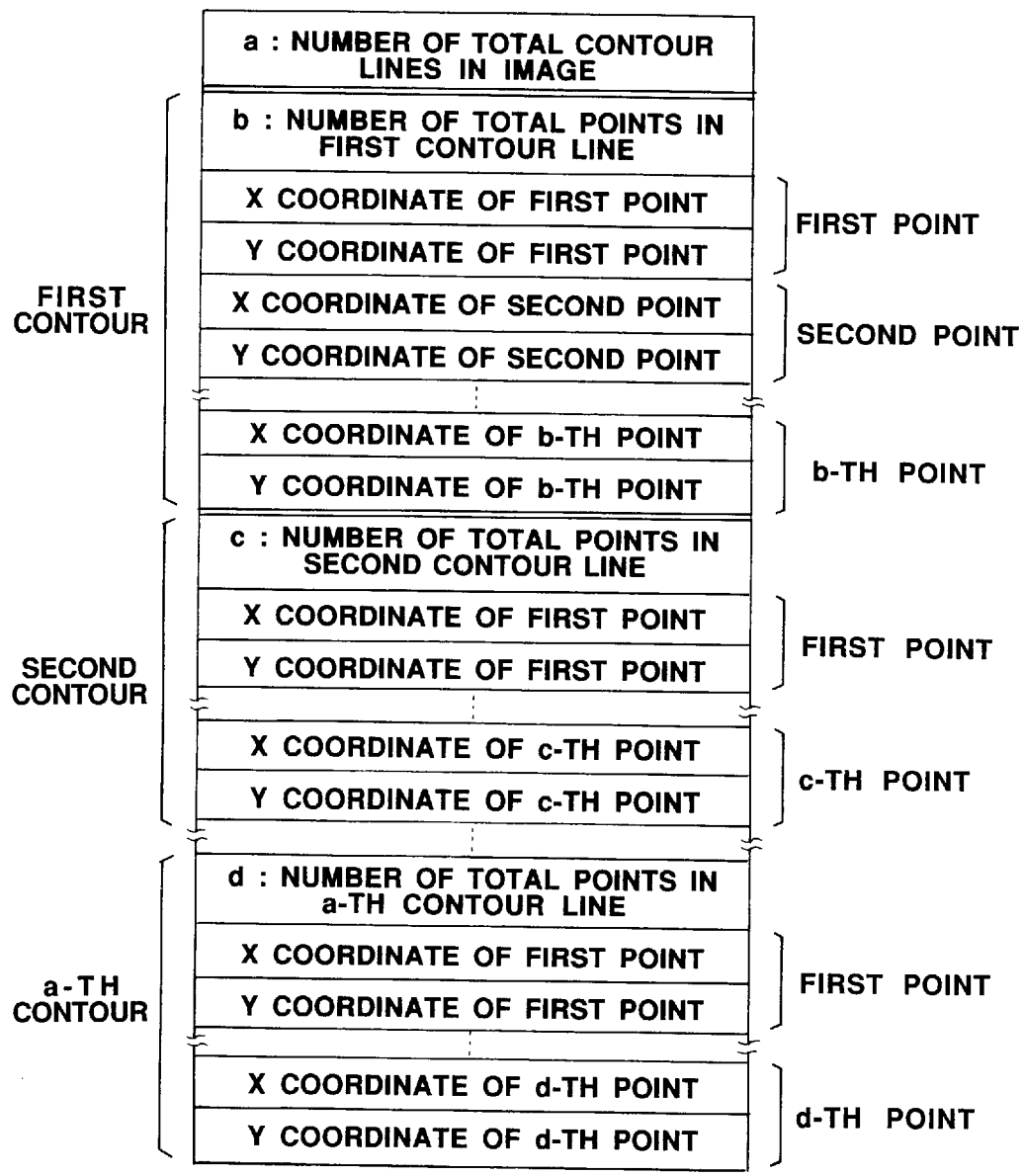
FIG. 5 is a diagram illustrating outline data output from outline extraction means.

The start point of each coarse contour vector is extracted as an intermediate position between pixels of the input image. Even a line segment portion having a one-pixel width in the original image is extracted as a coarse contour vector loop having a significant width. A group of coarse contour vector loops extracted in the above-described manner is output in the form of data as shown in FIG. 5 from outline extraction means 2. That is, the data comprise the number "a" of total coarse contour loops extracted from the image, and data groups of respective coarse contour loops from the first contour loop to the a-th contour loop. Each coarse contour loop data comprises the total number of start points of contour edge vectors present in the corresponding coarse contour loop (it may also be considered to be the number of total contour edge vectors), and a string of the values (the start points of horizontal vectors and the start points of vertical vectors are alternately arranged) of the coordinates (the x-coordinate values and the y-coordinate values) of the start points of respective contour edge vectors in the order of the configuration of the loop.

Figure 6:
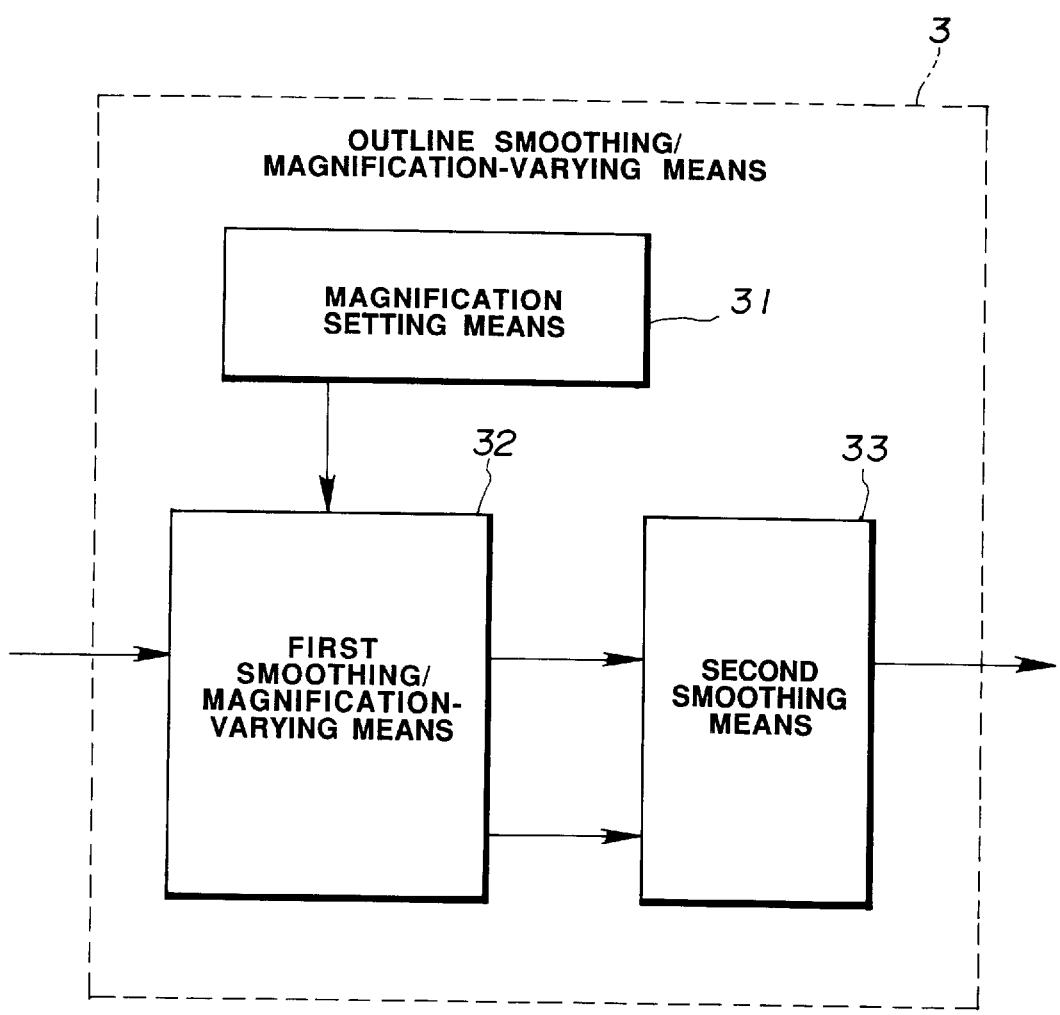
FIG. 6 is a block diagram showing the function of outline smoothing/magnification-varying means.

Outline smoothing/magnification-varying means 3 shown in FIG. 1 receives as input coarse contour vector data output from outline extraction means 2, and performs smoothing processing and magnification-varying processing on the data to provide a desired magnification in the form of outline-vector data (coordinate values). FIG. 6 shows a more detailed configuration of the outline smoothing/magnification-varying means. In FIG. 6, there are shown magnification setting means 31 for setting varying magnification, and first smoothing/magnification-varying means 32. Input coarse contour data are subjected to smoothing and magnification-varying processing with a magnification set by magnification setting means 31. The result of the processing is further subjected to smoothing processing by second smoothing means 33 to obtain a final output.

Magnification setting means 31 may, for example, provide the first smoothing/magnification-varying means with a fixed value preset by a DIP switch, a dial switch or the like, or with a value provided from the outside via an I/F (interface). It provides information relating to respective magnification values in the main-scanning (lateral) direction and in the sub-scanning (vertical) direction for the size of an input image.

First smoothing/magnification-varying means 32 obtains magnification information from magnification setting means 31, and performs smoothing and magnification-varying processing.

Figure 7:
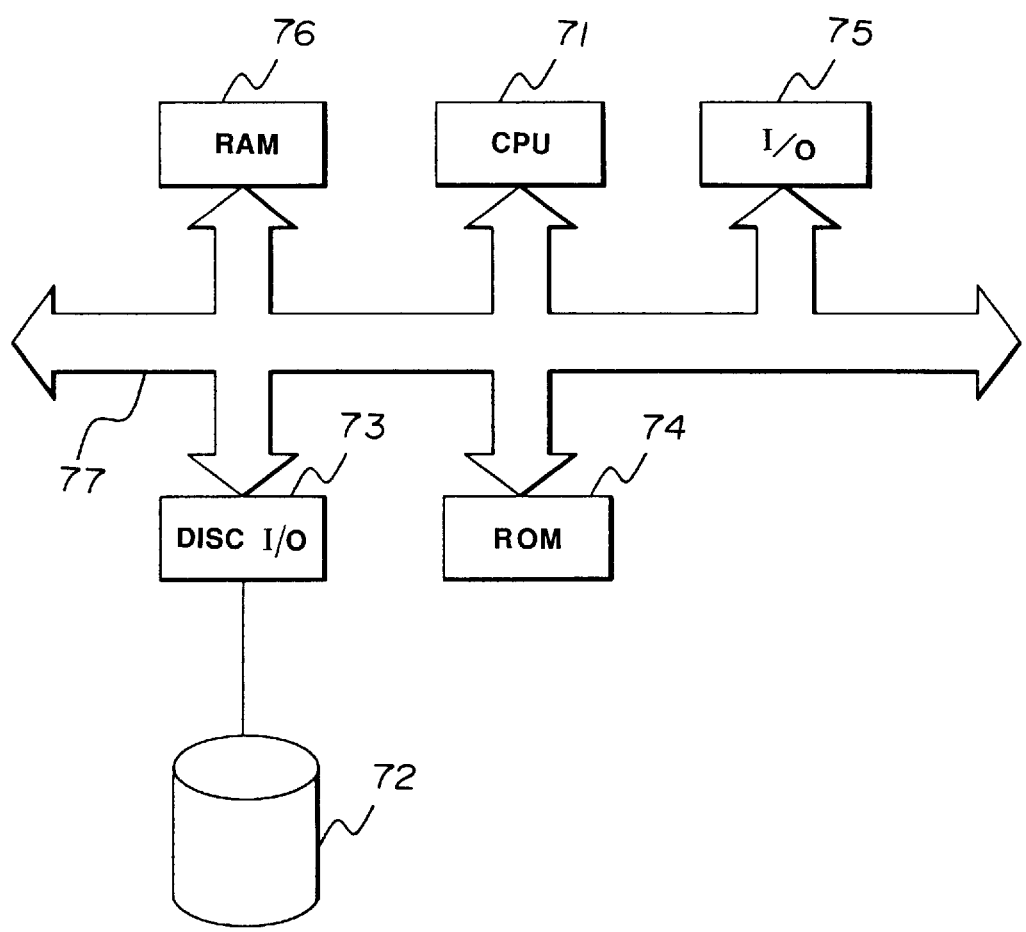
FIG. 7 is a block diagram showing the configuration of the outline smoothing/magnification-varying means.

FIG. 7 shows an example of the configuration of hardware for realizing the outline smoothing/magnification-varying means. In FIG. 7, there are shown CPU 71, memory disk device 72, disk I/O 73, ROM (read-only memory) 74, I/O port 74, RAM (random access memory) 76, and bus 77 for connecting the above-described respective blocks.

The output from the outline extraction means shown in FIG. 2 is filed in memory disk device 72 in the form shown in FIG. 5 to provide coarse contour vector data.

Figure 8:
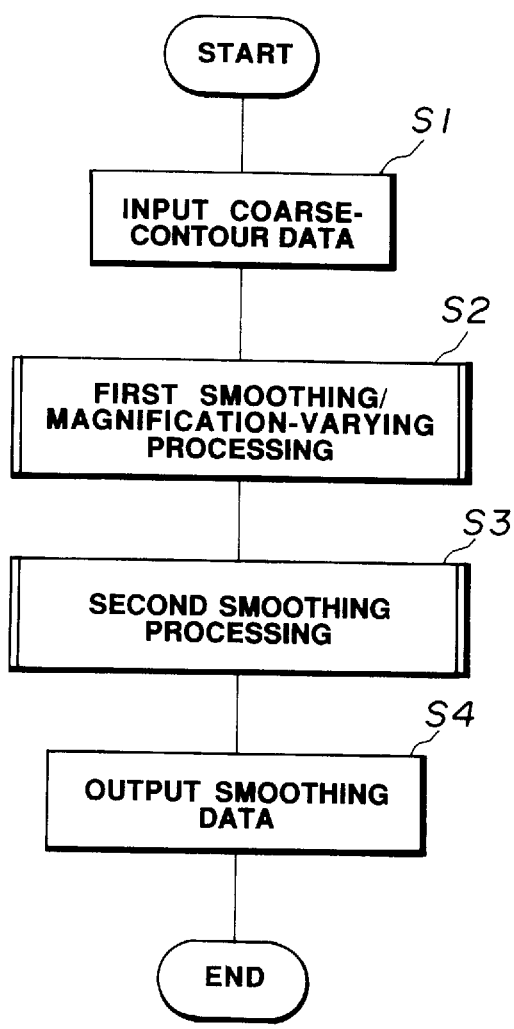
FIG. 8 is a flowchart showing an outline of outline smoothing/magnifiation-vaying processing.

CPU 71 operates according to the procedure shown in FIG. 8, and executes outline smoothing/magnification-varying processing. In step S1, CPU 71 reads coarse contour data stored in memory disk device 72 via disk I/O 73, and writes the read data in a working memory region 76. Thereafter, in step S2, first smoothing and magnification-varying processing is performed.

Figure 9:
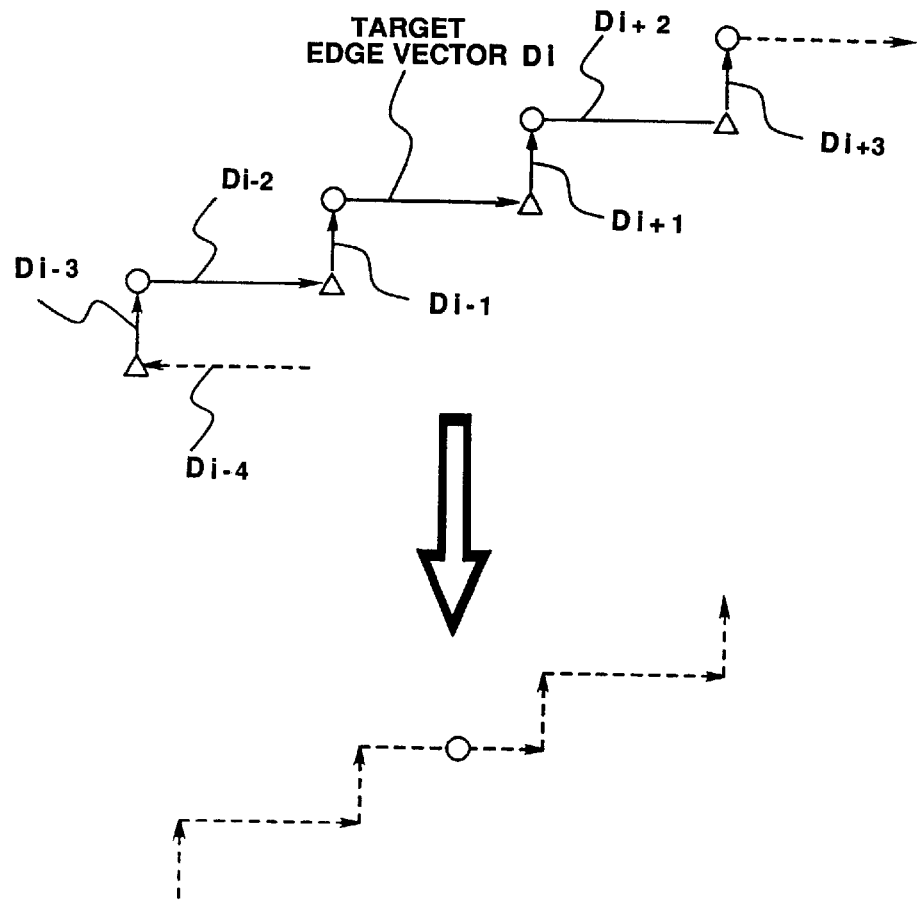
FIG. 9 is a diagram illustrating an operation of first smoothing processing.

First smoothing processing is performed in units of each closed loop of coarse contour data. Attention is sequentially paid to each contour edge (a horizontal vector or a vertical vector) of each coarse contour data. Each target contour edge vector is classified into a pattern in accordance with a combination of the lengths and the directions of consecutive edge vectors comprising at most three preceding and succeeding vectors (that is, at most seven edge vectors, consisting of three vectors preceding the target edge vector, the target edge vector, and three vectors succeeding the target edge vector). For each case, a contour point after first smoothing processing for the target edge is defined, and additional information indicating the coordinate value of the contour point after first smoothing processing and whether or not the contour point is a salient point (hereinafter termed salient-point information) is output. The contour point after first smoothing processing which has been determined to be a salient point becomes a point which will not be smoothed in the succeeding second smoothing processing. The contour point after first smoothing processing which has not been determined to be a salient point will be further smoothed in the succeeding second smoothing processing. FIG. 9 shows an example of such an operation, that is, target coarse contour edge vector $D_i$, three edge vectors $D_{i-1}$, $D_{i-2}$ and $D_{i-3}$ preceding the target coarse contour vector, three edge vectors $D_{i+1}$, $D_{i+2}$ and $D_{i+3}$ succeeding the target coarse contour vector, and a contour point after first smoothing processing defined for the target edge $D_i$.

In the output from the outline extraction means, a coarse contour loop is in some cases defined by as few as four edge vectors. When a coarse contour loop is configured by less than seven edge vectors, an edge vector succeeding the target edge vector in some cases equals an edge vector preceding the target edge vector. That is, if one loop is configured by four vectors, edge vectors $D_{i-3}$, $D_{i-2}$ and $D_{i-1}$ equal edge vectors $D_{i+1}$, $D_{i+2}$ and $D_{i+3}$, respectively, in the case of the above-described representation with respect to the target edge vector $D_i$. If one loop is configured by six vectors, edge vectors $D_{i-3}$ and $D_{i-2}$ equal edge vectors $D_{i+2}$ and $D_{i+3}$, respectively.

When one coarse contour loop is configured by four edge vectors, a rule may exist in which a contour point is not defined for each target edge, but contour-point data after first smoothing processing are defined for a coarse contour loop.

Next, a description will be provided of each pattern of the lengths and the directions of a target edge vector to be subjected to first smoothing processing and at most three preceding and succeeding edge vectors, and a method of defining a contour point after first smoothing processing which will become an output for the target edge vector in each pattern.

Input coase contour data are provided in the above-described form illustrated in FIG. 5. If the number of contour points (the start points of contour edge vectors) contained in each contour loop is represented by n, the contour edge vector having the first point and the second point as the start point and the end point, respectively, is defined as the first edge vector, the coutour edge vector having the second point and the third point as the start point and the end point, respectively, is defined as the second edge vector, the contour edge vector having the i-th (i<n) point and the (i+1)-th point as the start point and the end point, respectively, is defined as the i-th edge vector, and the contour edge vector having the n-th point (the final point within the contour loop) and the first point as the start point and the end point, respectively, is defined as the n-th edge vector. As described above, in a contour loop, vertical edge vectors and horizontal edge vectors are alternately connected, and a contour loop is always configured by an even number of edge vectors.

In a vertical edge vector, the x-coordinate values of the coordinates of the start point and the end point are equal. Hence, the length and the direction (the combined data are termed edge data) of the vertical edge vector are defined by a value obtained by subtracting the y-coordinate value of the start point from the y-coordinate value of the end point. That is, the absolute value of the difference is termed the length. Also, it is considered that the direction is upward if the difference has a negative value, and downward if the difference has a positive value. This is because the outline extraction means assumes a positive direction for a direction in the y-coordinate (the sub-scanning direction) from above to below.

In a horizontal edge vector, the y-coordinate values of the coordinates of the start point and the end point are equal. Hence, the length and the direction (the combined data are termed edge data) of the horizontal edge vector are defined by a value obtained by subtracting the x-coordinate value of the start point from the x-coordinate value of the end point. That is, the absolute value of the difference is termed the length. Also it is considered that the direction is leftward if the difference has a negative value, and the direction is rightward if the difference has a positive value. This is because the outline extraction means assumes a positive direction for a direction in the x-coordinate (the main-scanning direction) from the left to the right.

Figure 10:
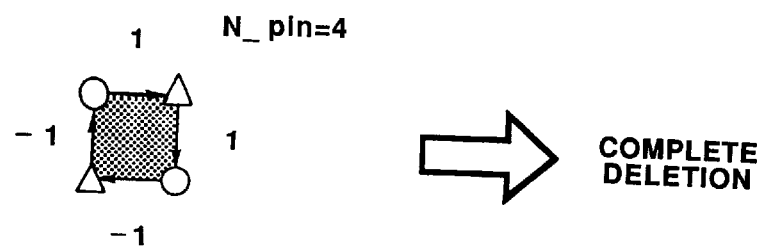
FIGS. 10 through 24 are diagrams illustrating respective rules of first smoothing processing.

FIG. 10 illustrates a case in which the coarse contour loop comprises four edge vectors, the respective vectors are connected in a clockwise direction, and the length of the four edge vectors are all 1. FIG. 10 indicates a rule that the entire loop is to be deleted in such a case. Whether or not the above-described conditions hold can be determined by checking whether or not the number of total points within the target coarse contour loop equals four, and the edge data of a vertical vector immediately after the first horizontal vector equal 1 and −1 if the edge data of the first horizontal vector equal 1 and −1, respectively. If these conditions hold, the state illustrated in FIG. 10 is provided. If these conditions do not hold, the state illustrated in FIG. 10 is not provided. This rule has the function of removing an isolated point which is a kind of noise peculiar to a binary image obtained by performing binary-coding processing of data read by an image reader.

Figure 11A:
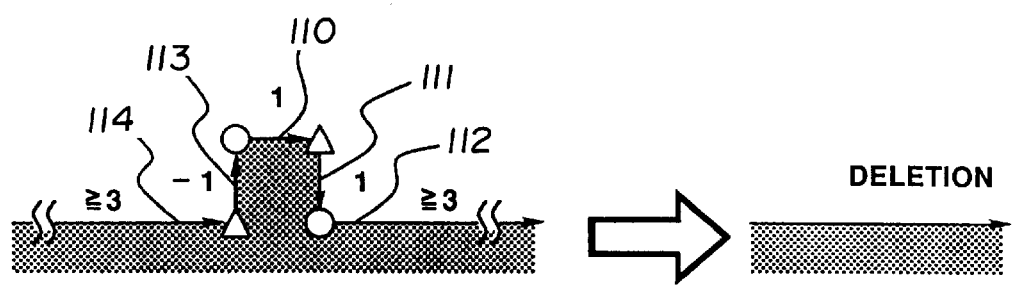
Figure 11B:
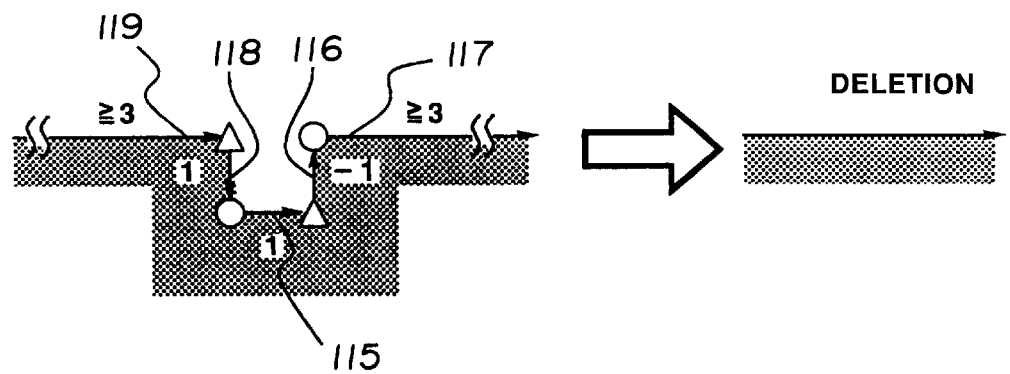

FIGS. 11(a) and 11(b) illustrate cases in which, when the length (that is, the absolute value of the edge data) of the edge vector in the center of five consecutive edge vectors equals 1, the edge data immediately before and after the central edge vector equal −1 and 1, and 1 and −1, respectively, and the second vectors before and after each central vector have the same direction as the central vector and have lengths equal to at least 3. In such a case, contour points after first smoothing processing are not defined for three edge vectors consisting of the central vector and the two adjacent vectors. This rule has the function of removing a one-dot notch, which is a kind of noise peculiar to a binary image obtained by performing binary-coding processing of data read by an image reader. Whether or not these conditions hold can be determined by detecting the pattern of a combination of edge data relating to a target edge vector and edge vectors surrounding the target edge vector for each of the three consecutive edge vectors. That is, each of the edge vectors serving as the center of a one-dot notch (edge vectors 110 and 115 shown in FIGS. 11(a) and 11(b), respectively) and the edge vectors immediately before those central vectors (edge vectors 113 and and 118 shown in FIGS. 11(a) and 11(b), respectively), and edge vectors immediately after the central vectors (edge vectors 111 and 117 shown in FIGS. 11(a) and 11(b), respectively) are each made to be a target edge vector, and combination patterns of edge data of edge vectors surrounding the target edge vector are defined in the following way. A pattern in which the edge vector immediately before the center of the one-dot notch is made to be the target edge vector corresponds to a case in which the length of the target edge vector equals 1, the length of the edge vector immediately after the target edge vector equals 1, the length of the edge vector immediately before the target edge vector equals at least 3, the direction of the edge vector immediately before the target edge vector is the same as the direction of the edge vector immediately after the target edge vector, and the length of the second edge vector after the target edge vector equals 1, and the direction of the second edge vector is reverse to the direction of the target edge vector. In such a case, a contour point after first smoothing processing is not defined for the target edge vector, i.e., the edge vector immediately before the center of the one-dot notch. A pattern in which the edge vector at the center of the one-dot notch is made to be the target edge vector corresponds to a case in which the length of the target edge vector equals 1, the edge vectors immediately before and after the target edge vector have the lengths equal to 1 and oppposite directions (the signs of edge data differ), and both second edge vectors before and after the target vector have the lengths equal to at least 3 and the same direction as the target edge vector. In such a case, a contour point after first smoothing processing is not defined for the target edge vector, i.e., the edge vector at the center of the one-dot notch. A pattern in which the edge vector immediately after the center of the one-dot notch is made to be the target edge vector corresponds to a case in which the length of the target edge vector equals 1, the length of the edge vector immediately before the target edge vector equals 1, the length of the edge vector immediately after the target edge vector equals at least 3, the edge vector immediately before the target edge vector has the same direction as the edge vector immediately after the target edge vector, and the second edge vector before the target edge vector has the length equal to 1 and the direction opposite to the direction of the target edge vector. In such a case, a contour point after first smoothing processing is not defined for the edge vector immediately after the center of the one-dot notch. Although FIG. 11 illustrates only a case in which the target edge vector is a rightward horizontal vector, the above-described rule includes all cases in which the target edge vector is a leftward horizontal vector, an upward vertical vector and a downward vertical vector.

Figure 12:
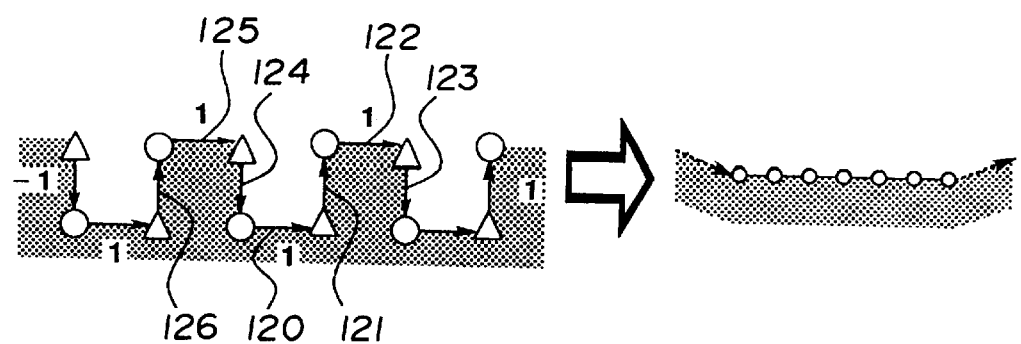

FIG. 12 illustrates a case in which the lengths of seven consecutive edge vectors are all 1, the target vector (120) has the same direction as the second edge vector (125) before the target edge vector and the second edge vector (122) after the target edge vector, and the directions of the edge vector (124) immediately before the target edge vector and the edge vector (121) immediately after the target edge vector, and the third edge vector (126) before the target edge vector and the third edge vector (123) after the target edge vector are alternately opposite to each other. In such a case, the target edge vector and edge vectors surrounding the target edge vector may be detected according to the above-described rule. For the target edge vector, if the target edge vector is a horizontal vector, a point whose x-coordinate value has the same value as the midpoint of the target edge vector and whose y-coordinate value has the same value as the midpoint of the edge vector immediately before the target edge vector is defined as a point after first smoothing processing. If the target edge vector is a vertical vector, a point whose x-coordinate value has the same value as the midpoint of the edge vector immediately before the target edge vector and whose y-coordinate value has the same value as the midpoint of the target edge vector is defined as a point after first smoothing processing. These points are made to be contour points which are not salient points (hereinafter simply termed "non-salient points"). Although FIG. 12 illustrates a case in which the target edge vector is a rightward horizontal vector, the above-described rule includes cases in which the target edge vector is a leftward horizontal vector, an upward vertical vector and a downward vertical vector. This rule has the function of removing consecutive notches (zigzags generated at every other pixel), which are a kind of noise peculiar to a binary image obtained by performing binary-coding processing of data read by an image reader.

Figure 13A:
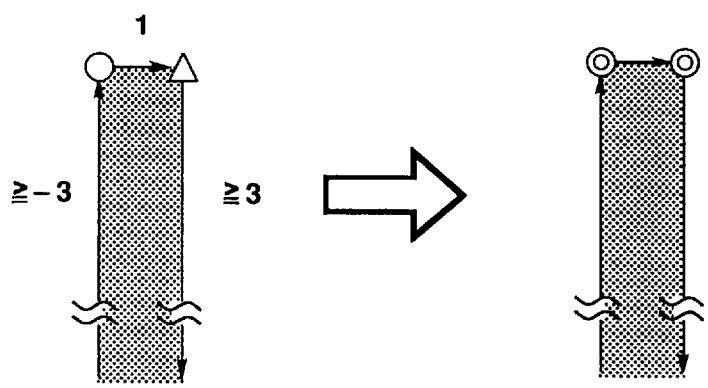
Figure 13B:
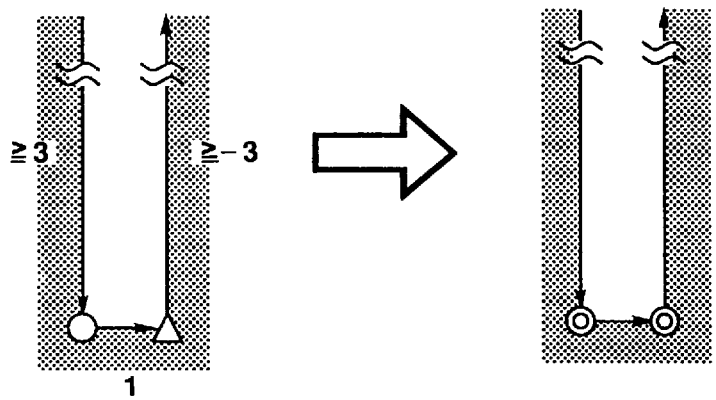

FIGS. 13(a) and 13(b) illustrate cases in which among three consecutive edge vectors, the length of the target edge vector equals 1, and the edge vectors immediately before and after the target edge vector have the lengths equal to at least 3 and the directions opposite to each other. It is only necessary to detect such conditions. Both the start point and the end point of the target edge vector are made to be salient contour points (hereinafter simply termed "salient points"), and unmodified coordinate values are defined as points after first smoothing processing. Although FIGS. 13(a) and 13(b) illustrate cases in which the target edge vectors are rightward horizontal vectors, the above-described rule includes cases in which the target edge vector is a leftward horizontal vector, an upward vertical vector and a downward vertical vector. This rule has the function of maintaining a fine-line projection and a fine-line recess, which are peculiar to a binary image obtained by performing binary-coding processing of data read by an image reader.

Figure 14:
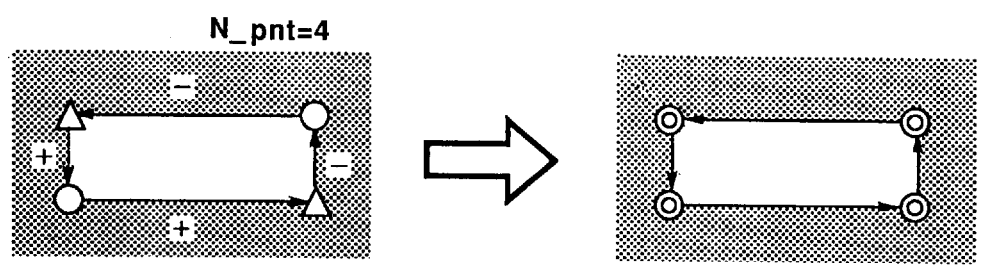

FIG. 14 illustrates a case in which a coarse contour loop comprises four edge vectors, and the respective edge vectors are connected counterclockwise. Whether or not such conditions hold can be determined by checking whether the number of total points within the target coarse contour loop equals 4, and whether, if the sign of the edge data of the first horizontal vector is positive (rightward), the sign of the edge data of the vertical vector immediately after the horizontal vector is negative (upward), and if the sign of the edge data of the first horizontal vector is negative (leftward), the sign of the edge data of the vertical vector immediately after the horizontal vector is positive (downward), that is, whether the sign of the edge data of the first horizontal vector differs from the sign of the edge data of the vertical vector immediately after the horizontal vector. If such conditions hold, all the four points within the loop are made to be salient points, and unmodified coordinate values are defined as points after first smoothing processing. This rule has the function of maintaining a fine white hole, which will frequently occur in a binary image obtained by performing binary-coding processing of data read by an image reader.

Figure 15:
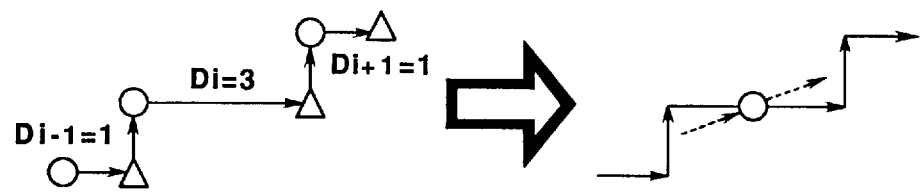
Figure 16:
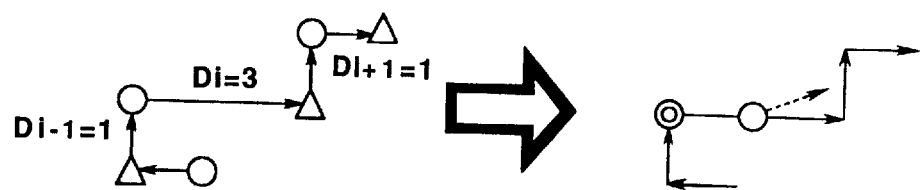
Figure 17:
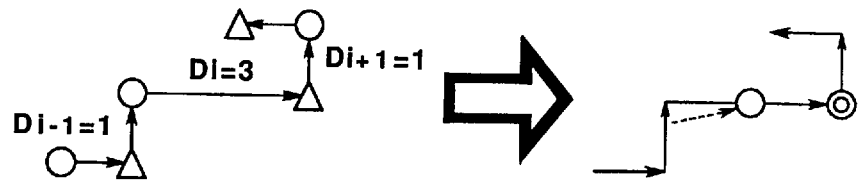
Figure 18:
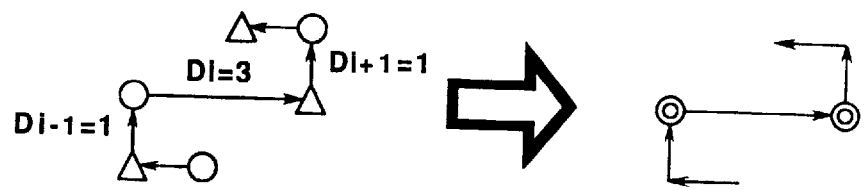

FIGS. 15 through 18 illustrate cases in which, when an edge vector at the center of consecutive five coarse contour vectors is made to the target edge vector, the length of the target edge vector equals at least 3, and the edge vectors immediately before and immediately after the target edge vector have the same direction (the signs of the edge data are equal) and the lengths equal to 1. FIG. 15 illustrates a case in which the second edge vectors before and after the target edge vector have the same direction as the target edge vector. In such a case, the coordinate value of the midpoint of the target edge vector is defined as a contour point after first smoothing processing. FIG. 16 illustrates a case in which the direction of the second edge vector ($D_{i-2}$) before the target edge vector (represented by $D_i$) is opposite to the direction of the target edge vector, and the second edge vector ($D_{i+2}$) after the target edge vector has the same direction as the target edge vector. In such a case, points after first smoothing processing are defined by making the unmodified coordinate value of the start point of the target edge vector to be a salient point, and making the coordinate value of the midpoint of the target edge vector to be a contour point. FIG. 17 illustrates a case in which the second edge vector ($D_{i-2}$) before the target edge vector ($D_i$) has the same direction as the target edge vector, and the direction of the second edge vector ($D_{i+2}$) after the target edge vector is opposite to the direction of the target edge vector. In such a case, points after first smoothing processing are defined by making the coordinate value of the end point of the target edge vector to be a salient point, and making the coordinate value of the midpoint of the target edge vector to be a contour point. FIG. 18 illustrates a case in which the directions of both the second edge vector ($D_{i-2}$) before the target edge vector ($D_i$) and the second edge vector ($D_{i+2}$) after the target edge vector are opposite to the direction of the target edge vector. In such a case, points after first smoothing processing are defined by making the unmodified coordinate values of the start point and the end point of the target edge vector to be salient points. In each of FIG. 15 through FIG. 18, it is only necessary to detect the target edge vector and edge vectors surrounding the target edge vector according to the corresponding rule. The rule shown in FIG. 15 has the function of further smoothing a slightly inclined portion. The rule shown in FIG. 16 or 17 has the function that in the vicinity of a contact portion between an inclined portion and a fine projection or recess, the inclined portion is further smoothed, and the projection or recess is preserved. The rule shown in FIG. 18 has the function of preserving fine projection and recess in a figure. Although each of FIGS. 15 through 18 illustrates a case in which the direction of the target edge vector is rightward and the directions of both edge vectors immediately before and after the target edge vector are upward, the above-described rules include cases in which the direction of the target edge vector is rightward and the directions of both edge vectors immediately before and after the target edge vector are downward, and the direction of the target edge vector is leftward and the directions of both edge vectors immediately before and after the target edge vector are downward, the direction of the target edge vector is leftward and the directions of both edge vectors immediately before and after the target edge vector are upward, the direction of the target edge vector is upward and the directions of both edge vectors immediately before and after the target edge vector are rightward or leftward, and the direction of the target edge vector is downward and the directions of both edge vectors immediately before and after the target edge vector are rightward or leftward.

Figure 19:
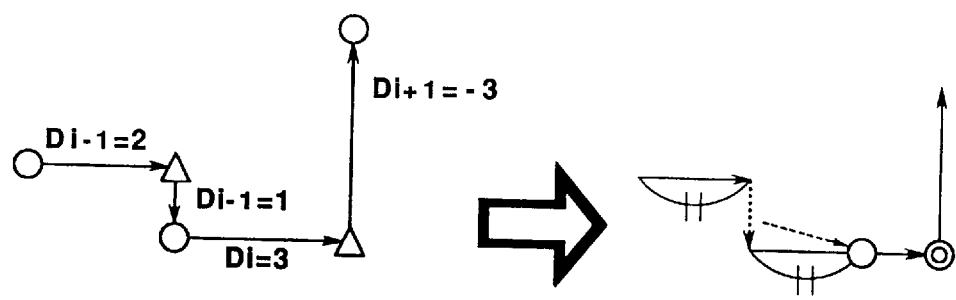
Figure 20:
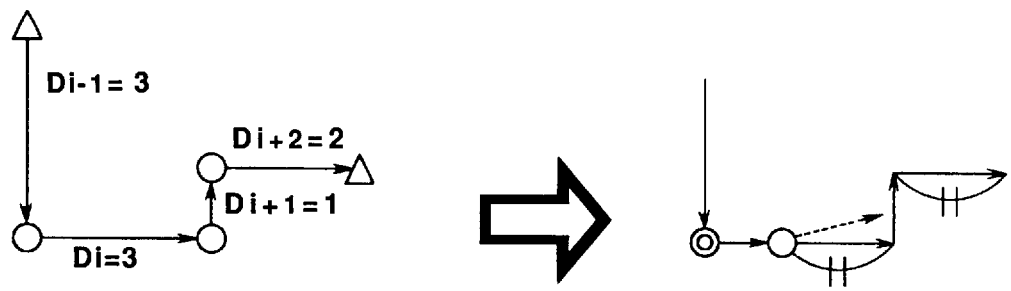

FIGS. 19 and 20 illustrate cases in which the length of the target edge vector equals at least 2, the length of one of the edge vectors immediately before and after the target edge vector equals 1, and the length of the other edge vector equals at least 2 (except a case in which the length of the target edge vector equals 2, and the length of at least one of the edge vectors immediately before and after the target edge vector equals 2). FIG. 19 illustrates a case in which the length of the edge vector immediately before the target edge vector equals 1, and the length of the edge vector immediately after the target edge vector equals at least 2. In such a case, if the length of the second edge vector before the target edge vector is shorter than the length of the target edge vector, points after first smoothing processing are defined by making a point whose coordinate value is at a position on the target edge vector separated from the start point toward the end point of the target edge vector by the length of the second edge vector before the target edge vector to be a contour point, and making the coordinate value of the end point of the target edge vector to be a salient point irrespective of the lengths of the target edge vector and the second edge vector before the target edge vector. FIG. 20 illustrates a case in which the length of the edge vector immediately before the target edge vector equals at least 2, and the length of the edge vector immediately after the target edge vector equals 1. In such a case, points after first smoothing processing are defined by making the coordinate value of the start point of the target edge vector to be a salient point, and making a point whose coordinate value is at a position on the target edge vector separated from the end point toward the start point of the target edge vector by the length of the second edge vector after the target edge vector to be a contour point if the length of the second edge vector after the target edge vector is shorter than the length of the target edge vector. In FIGS. 19 and 20, it is only necessary to detect the target edge vector-and edge vector surrounding the target edge vector according to the above-described rules. These rules have the function of further smoothing an inclined portion and preserving a salient point in the vicinity of the inclined portion and the salient point.

Figure 21:
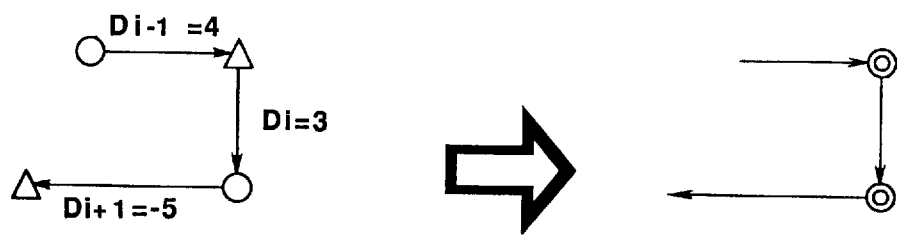

FIG. 21 illustrates a case in which the length of the target edge vector equals at least 3, and the lengths of both edge vectors immediately before and after the target edge vector equal at least 2. In such a case, points after first smoothing processing are defined by making both coordinate values of the start point and the end point of the target edge vector to be salient points. In FIG. 21, it is only necessary to detect the target edge vector and edge vectors surrounding the target edge vector in accordance with the above-described rule. This rule has the function of preserving a salient point.

Although each of FIGS. 19 through 21 illustrates a case in which the target edge vector has only direction, the above-described rules include all cases in which the direction of the target edge vector is leftward, rightward, upward and downward.

Figure 22:
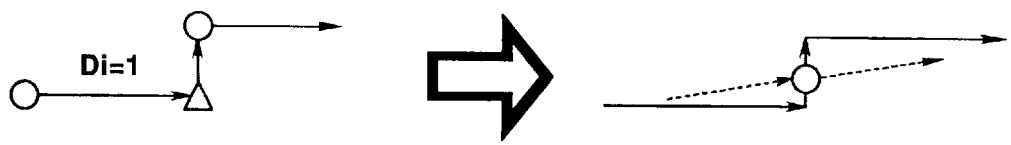

FIG. 22 illustrates a case in which the length of the target edge vector equals 1, and which does not correspond to any of the above-described cases. In such a case, a point after first smoothing processing is defined by making the coordinate value of the midpoint of the target edge vector to be a contour point. This rule has the function of smoothing an inclined portion.

Figure 23A:
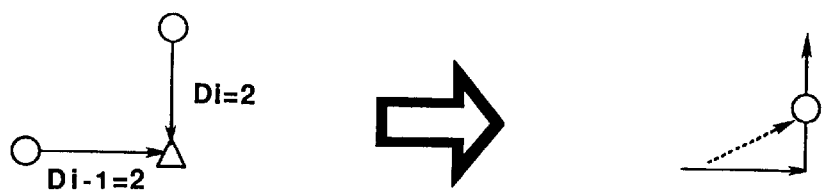
Figure 23B:
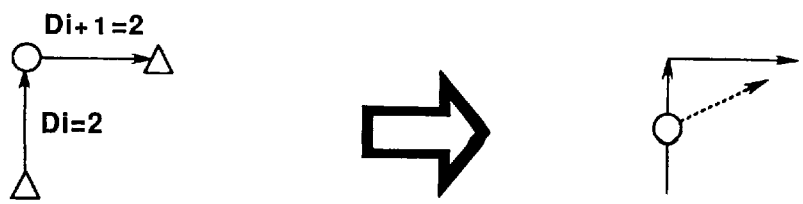

Each of FIGS. 23(a) and 23(b) illustrates a case in which the length of the target edge vector equals 2, and the length of at least one of the edge vectors immediately before and after the target edge vector equals 2. In such a case, a point after first smoothing processing is defined by making the coordinate value of the midpoint of the target edge vector to be a contour point. This rule has the function of smoothing an inclined portion.

Although FIGS. 22, 23(a) and 23(b) each illustrate a case in which the direction of the target edge vector is rightward, the above-described rules include all cases in which the direction of the target edge vector is leftward, rightward, upward and downward.

Figure 24:
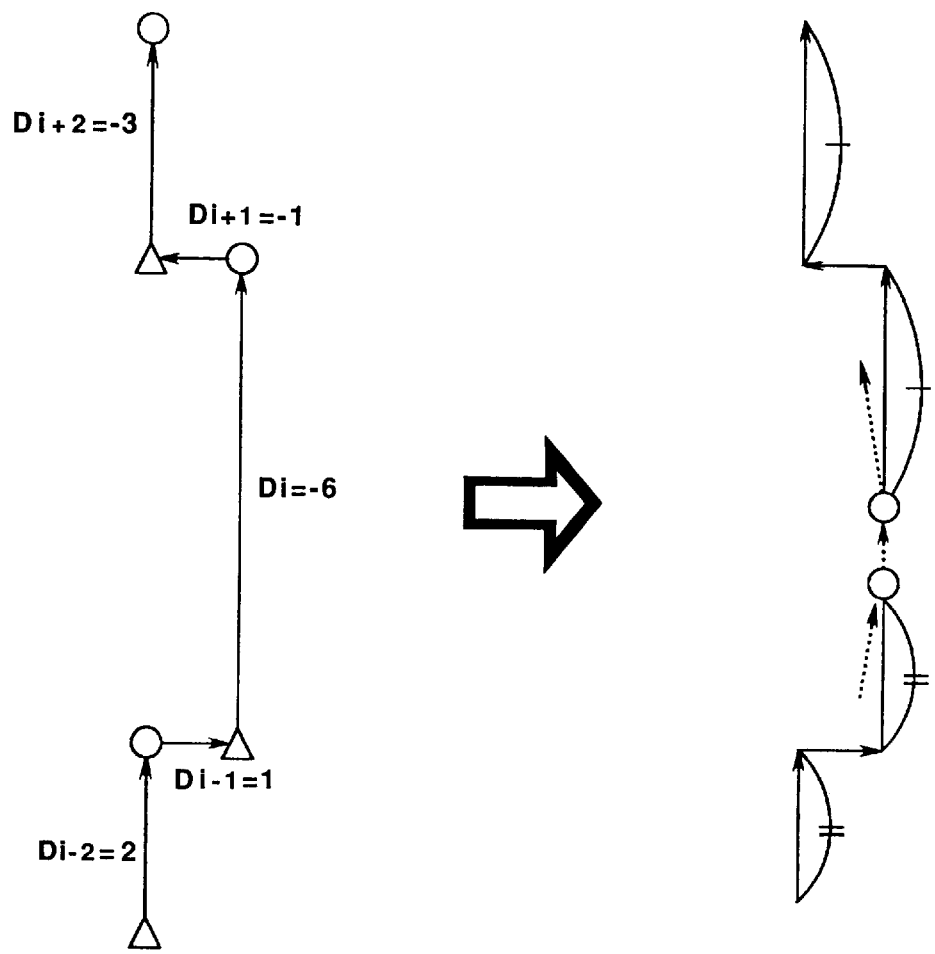

FIG. 24 illustrates a case in which the length of the target edge vector equals at least 3, and the edge vectors immediately before and after the target edge vector have the same length 1 and different directions, and the sum of the lengths of the second edge vectors before and after the target edge vector is shorter than the length of the target edge vector. In such a case, points after first smoothing processing are defined by making a point whose coordinate value is at a position on the target edge vector from the start point toward the end point of the target edge vector by the length of the second edge vector before the target edge vector to be a contour point, and making a point whose coordinate value is at a position on the target edge vector from the end point toward the start point of the target edge vector by the length of the second edge vector after the target edge vector to be a contour point. This rule has the function of further smoothing a smooth curved portion. Although FIG. 24 illustrates a case in which the direction of the target edge vector is upward, and the directions of the edge vectors immediately before and after the target edge vector are rightward and leftward, respectively, the above-described rules are not limited to such a configuration, but include all cases in which the direction of the target edge vector is upward, downward, leftward and rightward, and the edge vectors immediately before and after the target edge vector have the same length 1 and different directions.

In cases which do not correspond to any of the rules described with reference to FIGS. 10 through 24, a point after first smoothing processing is defined by making the coordinate value of the midpoint of the target edge vector to be a contour point.

Figure 25:
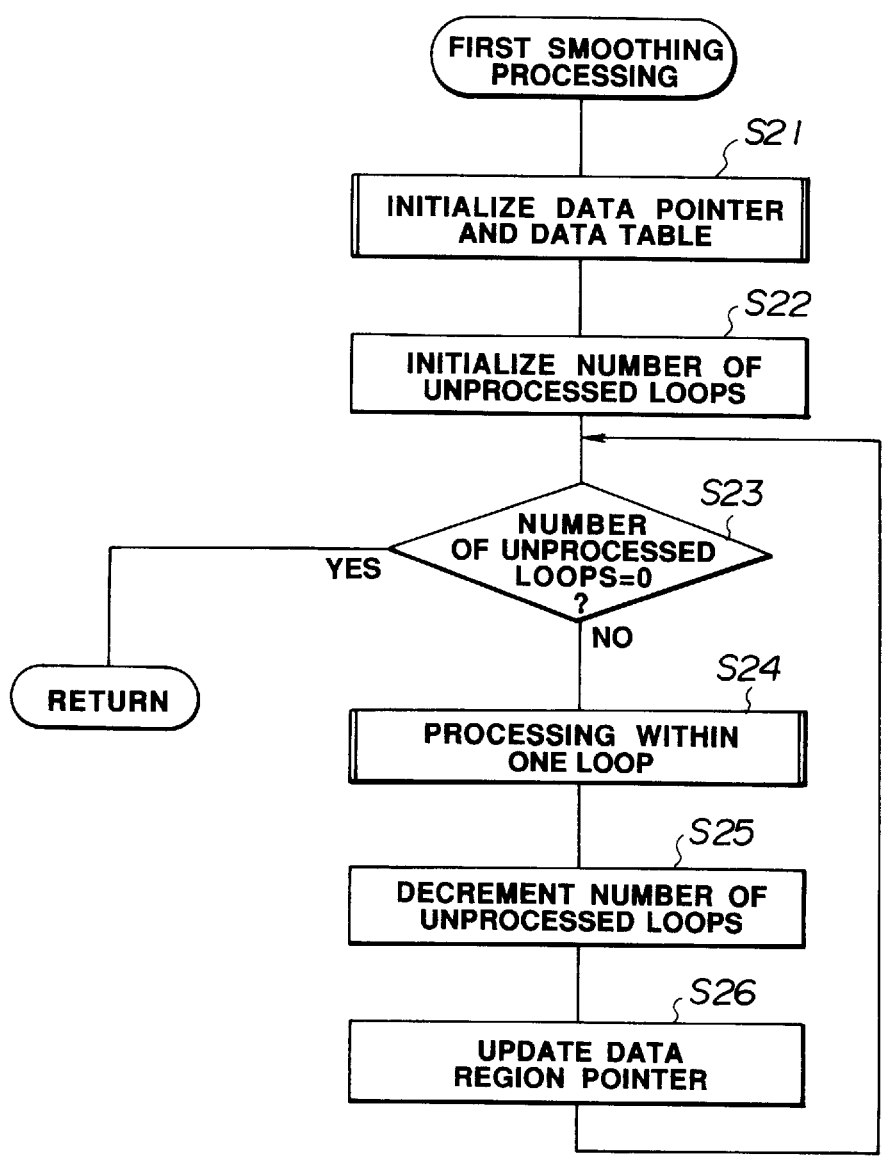
FIG. 25 is a flowchart showing first smoothing processing.

Next, a description will be provided of the operation of first smoothing processing by CPU 71 in step S2 shown in FIG. 8 with reference to FIGS. 25 through 31. FIG. 25 illustrates a major flow of the first smoothing processing. If a routine for first smoothing processing is called for in step S2 shown in FIG. 8, the processing indicated by the flow shown in FIG. 25 is executed. In step S21, a data point, a data table and a counter region (not shown) required for processing coarse contour data read in working memory region 76 in step S1 shown in FIG. 8 are secured in working memory region 76, and are initialized. Magnification setting means 31 provides respective desired magnifications in the main-scanning direction and the sub-scanning direction. In step S22, the number of total contour lines in the image within coarse contour data is copied and stored in a temporary region for the processing as data of the number of unprocessed loops. In step S23, it is determined whether or not the number of unprocessed loops is 0. If the result of the determination is affirmative, a series of processes of first smoothing processing are terminated, and the process returns to the flow shown in FIG. 8. If the result of the determination in step S23 is negative, the process proceeds to step S24. In step S24, a series of processes of first smoothing processing for each coarse contour data on the corresponding coarse contour loop are performed with the leading address of the data region in working memory region 76 of coarse contour loop data to be processed. The contents of the processes will be described in detail later with reference to FIG. 26. The leading address (held in a region pointer for data) of the data region in working memory region 76 of the coarse contour loop data to be processed is first initialized in step S21 to the leading address of the data of the first contour. After the completion of the process of step S24, the process proceeds to step S25. In step S25, the number of unprocessed loops is decremented by one. In step S26, the data region pointer is updated by making the leading address of the data region of the coarse contour loop next to the processed coarse contour loop to be the leading address of the coarse contour data region to be processed. This updating operation can be easily performed by adding the amount of data of the coarse contour points which have been present within the coarse contour loop just processed in step S24 to the leading address of the data region of the just processed coarse contour loop. After the completion of the process of step S26, the process returns to step S23, where the same processes are repeated.

Figure 26:
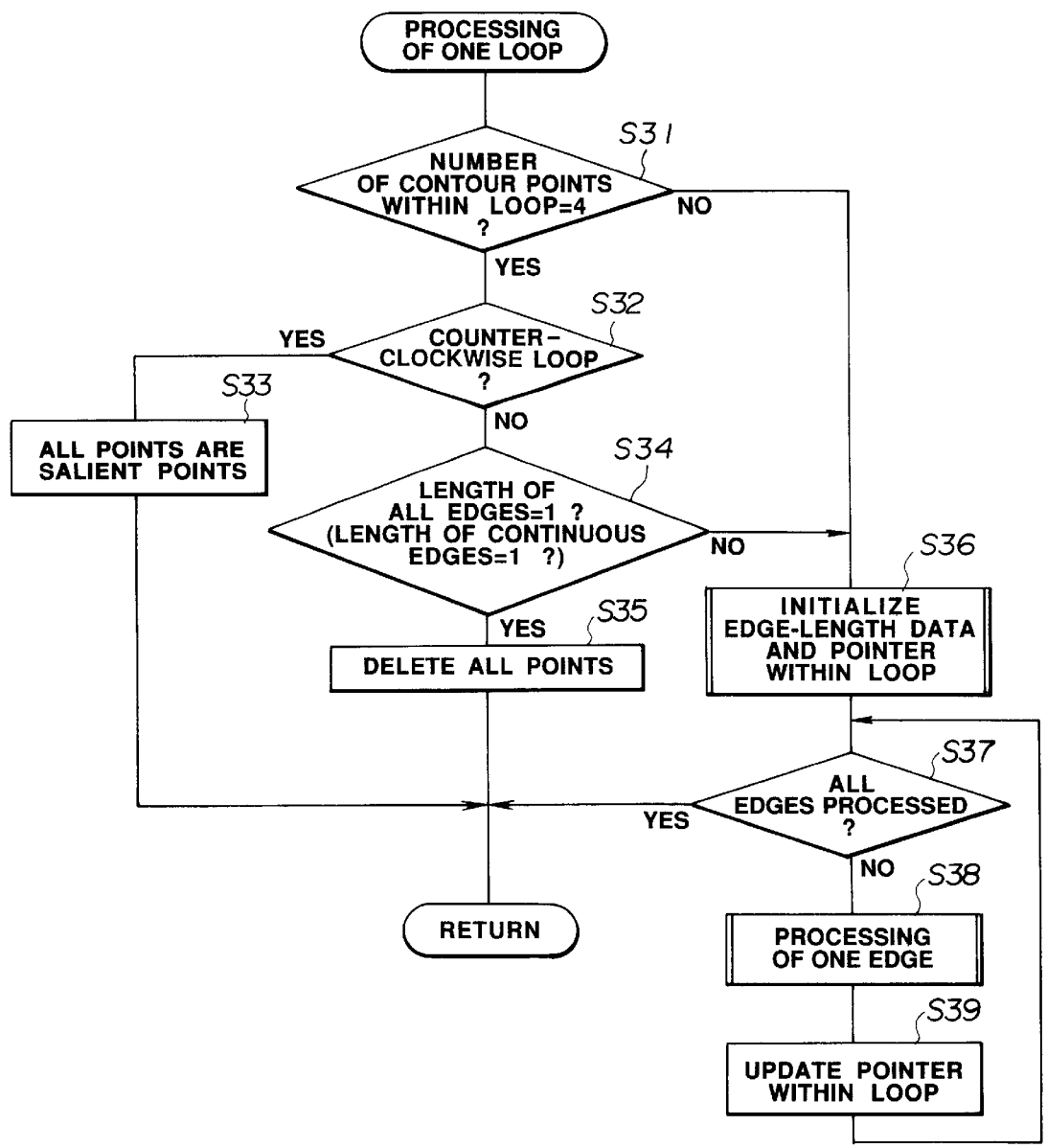
FIG. 26 is a flowchart showing the flow of first smoothing processing for a coarse contour loop.

Next, a description will be provided of the process within one loop in step S24 shown in FIG. 25 with reference to FIG. 26. In the flow shown in FIG. 26, the process is started by being called for in step S24 shown in FIG. 25. In step S31, it is determined whether or not the number of total coarse contour points present in a region assigned by a data region pointer equals 4. If the result of the determination is affirmative, the process proceeds to step S32. If the result of the determination in step S31 is negative, the process proceeds to step S36. In step S32, it is determined whether or not the coarse contour loop comprising 4 points is a counterclockwise loop. That is, when the edge data of the first horizontal vector is represented by $D_i$, if $D_i<0$ and $D_{i+1}>0$, or if the $D_i>0$ and $D_{i+1}<0$, the coarse contour loop is a counterclockwise loop. In other cases, the coarse contour loop is a clockwise loop. In the case of a counterclockwise loop, the process proceeds to step S33. In the case of a clockwise loop, the process proceeds to step S34. In step S33, since the coarse contour loop is a counterclockwise loop having four course contour points and corresponds to the case shown in FIG. 14, all four coarse contour points are output as salient points. Although a detailed description will be omitted, discrimination as to whether a point is a salient point or a non-salient point is performed using a pointer in the same manner as in the case of dealing with the coordinate data region with securing an additional data region in RAM region 76 in addition to the coordinate data region. The additional data region is secured as a continuous memory region for respective contour points (both salient points and non-salient points). After the completion of the process of step S33, the process returns to the routine shown in FIG. 25 assuming that the process of this coarse contour loop has been completed.

In step S34, it is determined whether or not the lengths of all edge data of the clockwise loop having four coarse contour points equal 1. That is, it is determined whether or not the first edge data $D_i=1$ or $D_i=-1$, and $D_{i+1}=1$ or $D_{i+1}=-1$. If these conditions hold, it is determined that the lengths of all the edge data equal 1, and the process proceeds to step S35. In other cases, the process proceeds to step S36. The loop to be processed in step S35 is a clockwise loop which has four coarse contour points and in which the lengths of all edge data equal 1, and therefore corresponds to the isolated point shown in FIG. 10. In such a case, all the coarse contour points of the coarse contour loop are deleted. After the completion of the process of step S35, the process returns to the routine shown in FIG. 25 assuming that the process for this loop has been completed.

In step S36, initialization required for processing for respective contour edge data within the coarse contour loop is performed. That is, all edge data between respective coarse contour points present within the coarse contour loop are generated. In addition, pointers and registers for sequentially processing data within the loop are initialized, and the process proceeds to step S37, after which attention is paid to each edge and processing for each edge is executed. In step S37, it is determined whether or not processing has been completed for all edges within this loop. If the result of the determination is affirmative, the process returns to the routine shown in FIG. 25 assuming that the processing for this coarse contour loop has been completed. If the result of the determination in step S37 is negative, the process proceeds to step S38. Whether or not all the edges have been processed is determined in the following way. That is, in step S36, the number of contour points within the loop is assumed to be the number of unprocessed edges, and is copied and stored in a temporary region for the processing. Thereafter, every time processing for one edge has been completed, the number of unprocessed edges stored in the temporary region for the processing is sequentially decremented. In step S37, it is determined whether or not the number of unprocessed edges equals 0.

Figure 27:
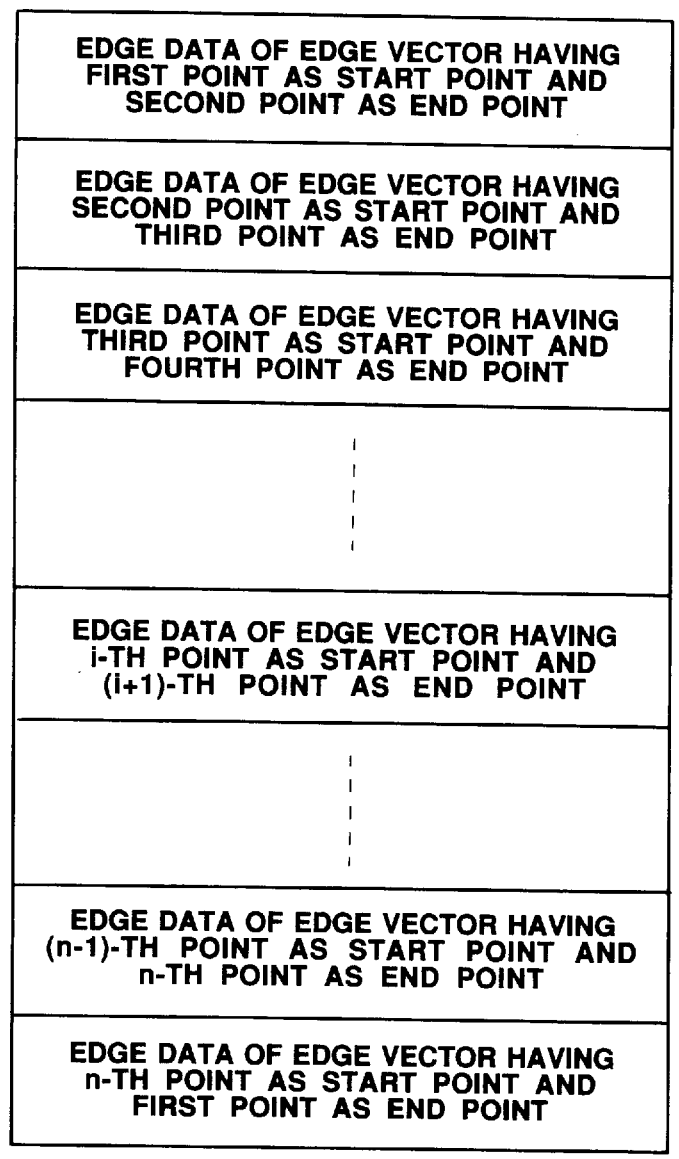
FIG. 27 is a diagram illustrating edge data used in first smoothing processing.

In step S38, the edge data of the edge vectors formed in step S36, a pointer for providing the address of a region in which the edge data of the target edge vector at that time is stored, and a pointer for providing the address of a region in which the coordinate values of the start point and the end point of the target edge vector are stored are used for the processing. These pointers are initialized in step S36, and are thereafter used while updating the addresses stored in the pointers by the size of the data region for one edge every time processing of one edge has been completed. FIG. 27 shows the configuration of the edge data region of edge vectors formed in step S36. Data for each edge are obtained by calculating the difference between the coordinate values of two consecutive contour points in the contour-point string. That is, a horizontal vector is formed by subtracting the x-coordinate value of the start point from the x-coordinate value of the end point, and a vertical vector is formed by subtracting the y-coordinate value of the start point from the y-coordinate value of the end point. Respective edge data are stored in a memory region in the order of the original arrangement of coarse contour points in a manner in which horizontal vectors and vertical vectors are alternately present and the addresses of the data continue in the ascending or descending order. The details of the contents of the process of step S38 will be described below with reference to FIGS. 28 through 31. In step S39, the above-descrived pointers of the edge data and the coordinate-value data for the memory region are updated so that the next data region can be referred to, and the number of unprocessed edges is decremented by one. After the completion of the process of step S39, the process returns to step S37, where the same processes are repeated.

Figure 28:
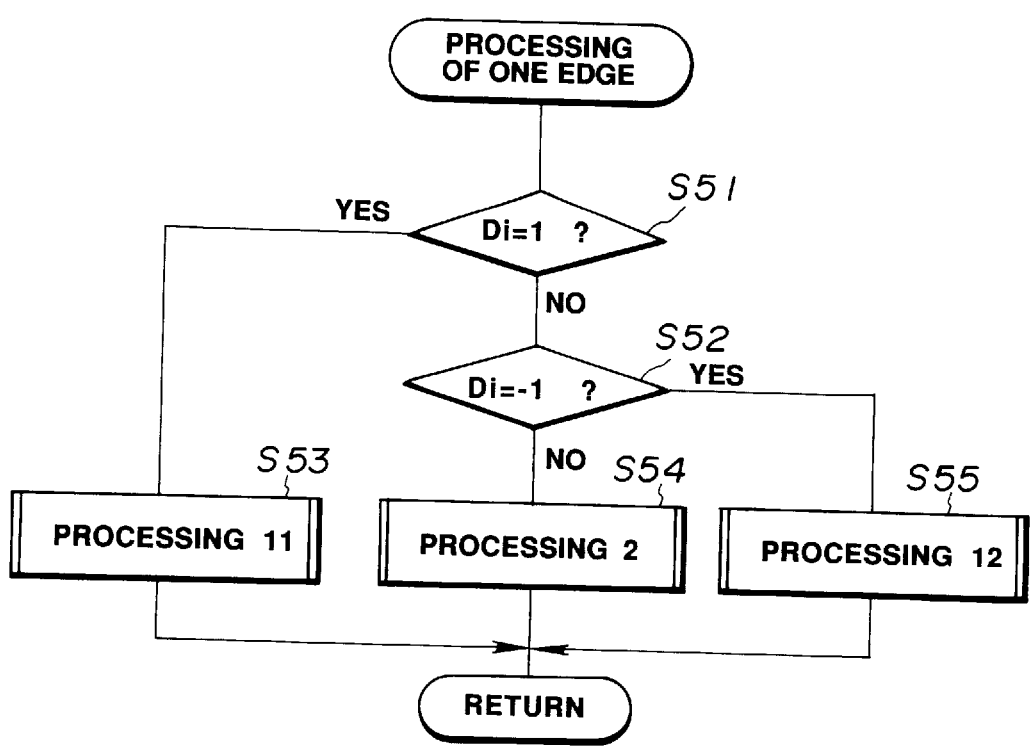
FIGS. 28 through 37 are flowcharts illustrating in detail the flow of first smoothing processing for the coarse contour vector of an edge.
Figure 29:
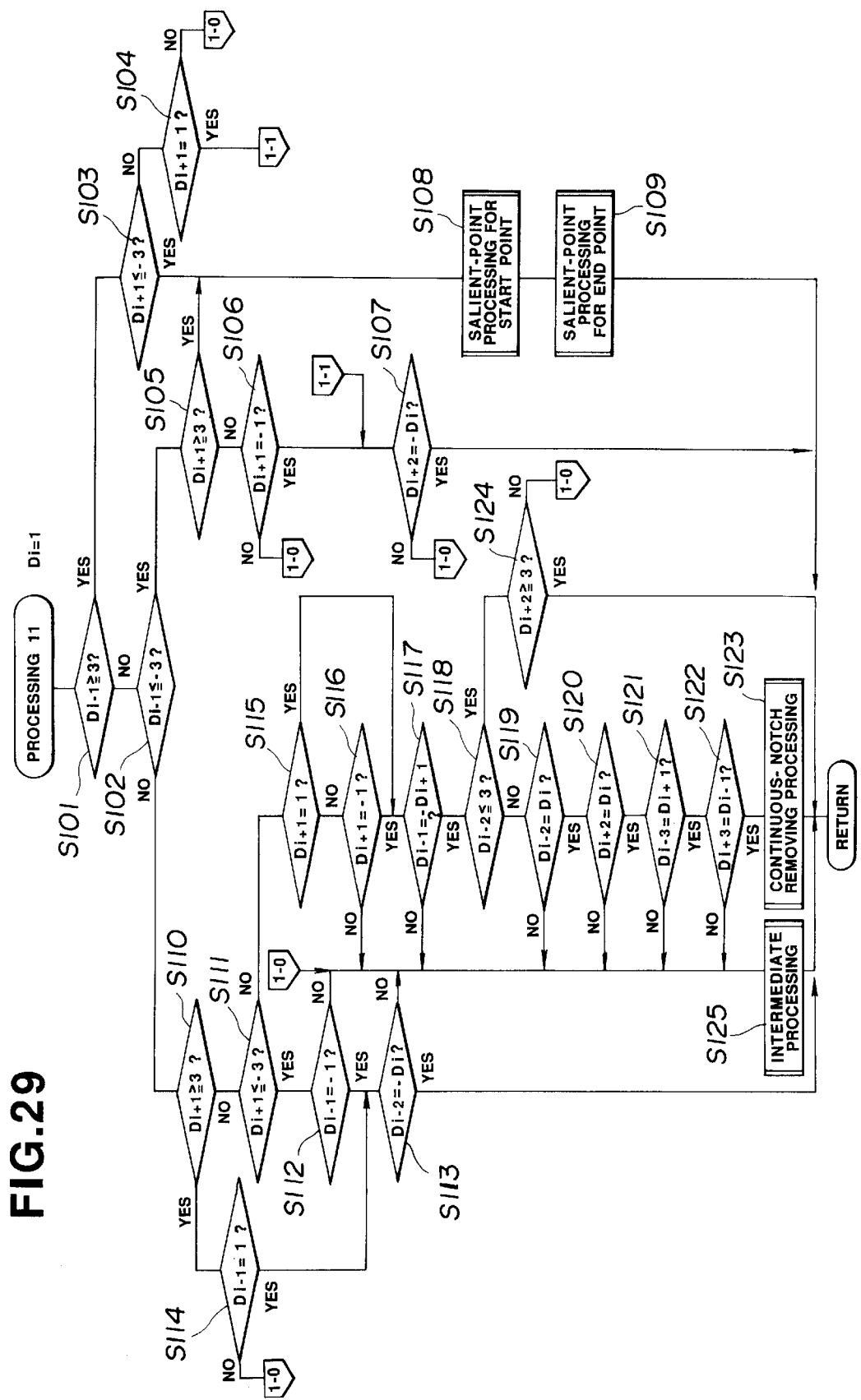
Figure 30:
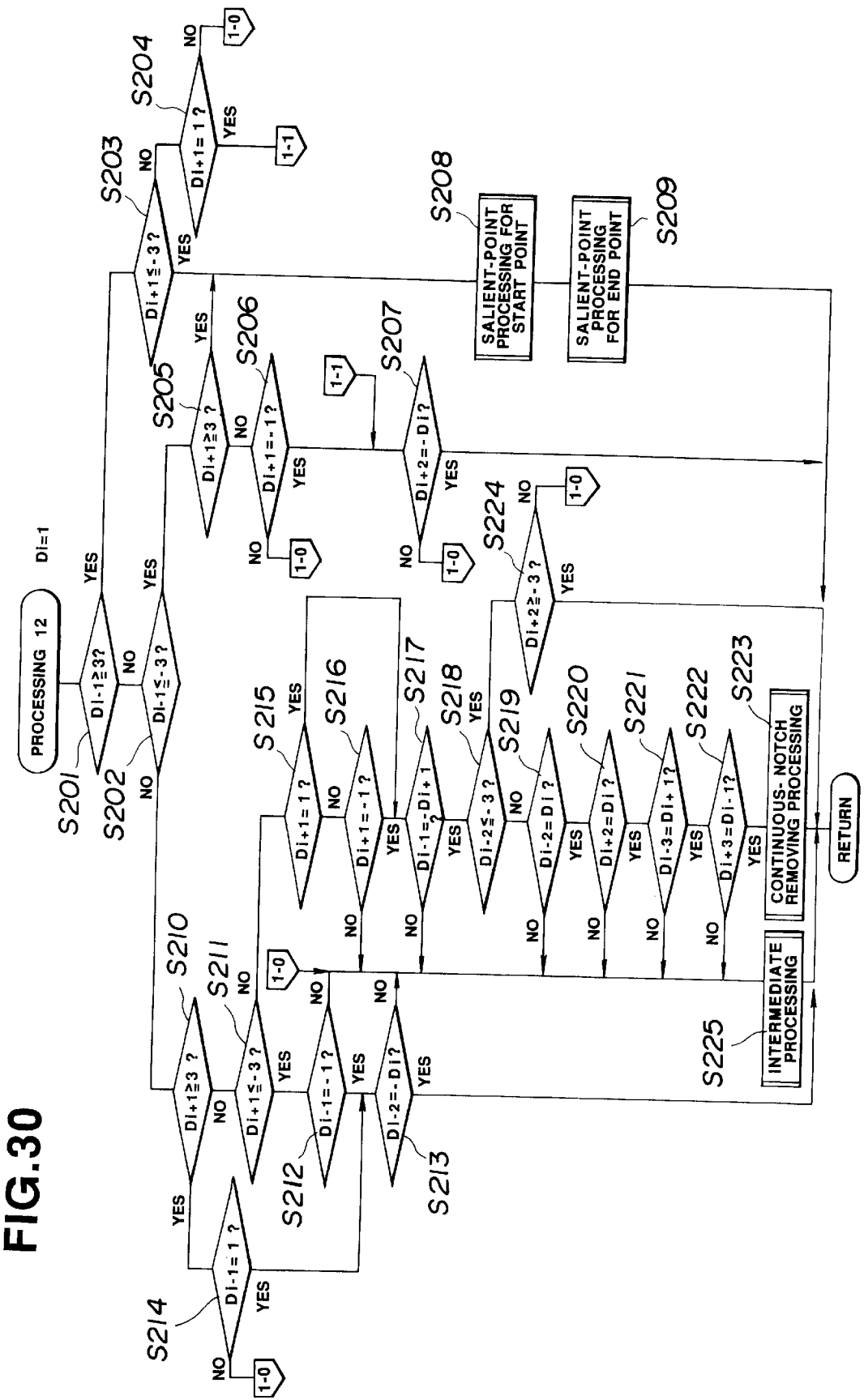
Figure 31:
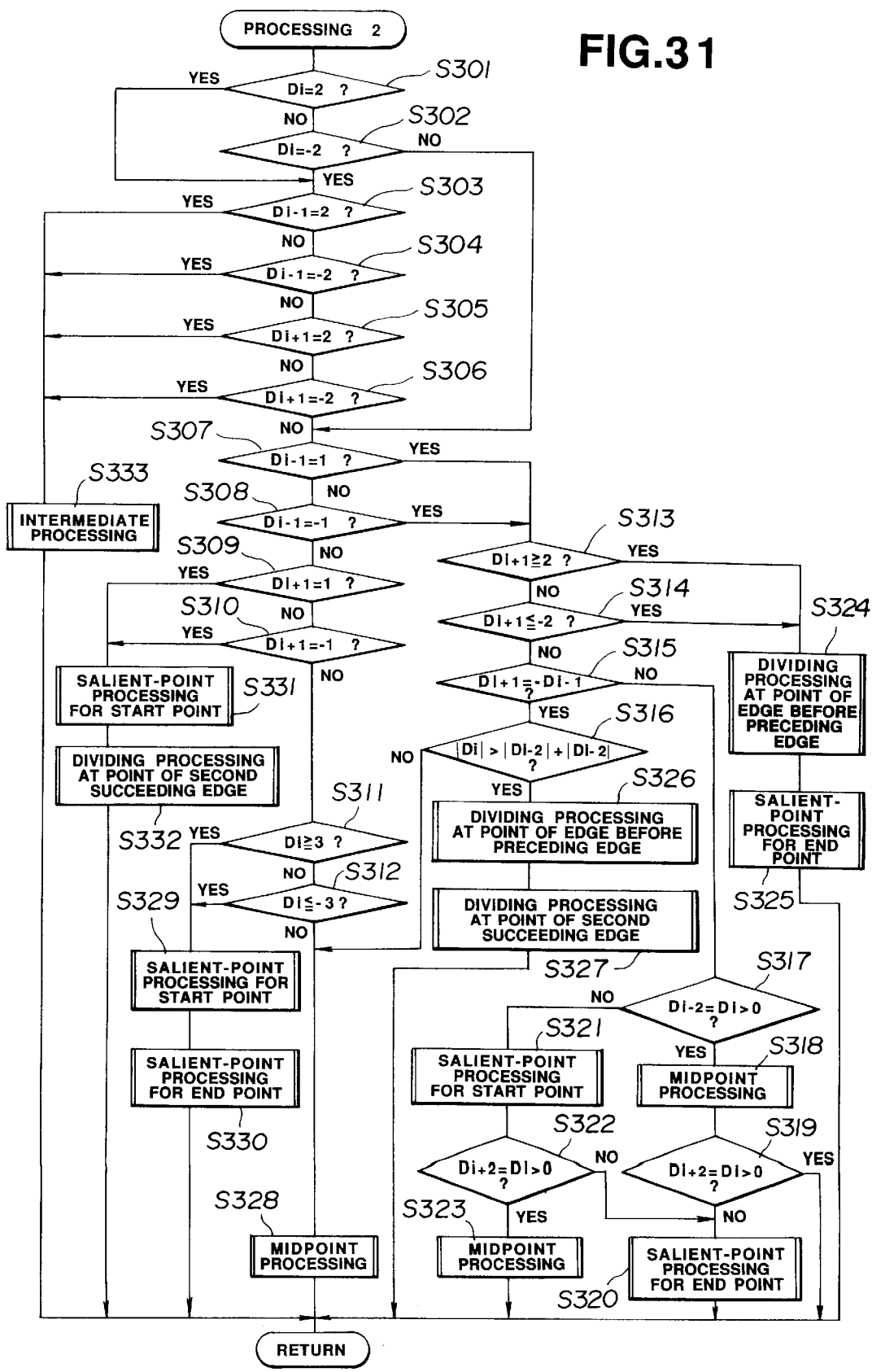

Next, a description will be provided of smoothing processing for one edge vector with reference to FIGS. 28 through 31. The processing of the flow shown in FIG. 28 is started by being called for in step S38 shown in FIG. 26. In step S51, it is determined whether or not the edge data of the target edge vector equals 1. If the result of the determination is affirmative, the process proceeds to step S53, where the corresponding process is performed. If the result of the determination in step S51 is negative, the process proceeds to step S52. In step S52, it is determined whether or not the edge data of the target edge vector equals −1. If the result of the determination is affirmative, the process proceeds to step S55, where the corresponding process is performed. If the result of the determination in step S52 is negative, the process proceeds to step S54, where the corresponding process is performed. In step S53, processing for when the edge data of the target edge vector equals 1, that is, the length of the vector equals 1 and the direction of the vector is rightward or downward, is performed. FIG. 29 shows the contents of the processing, a detailed description of which will be provided below. In step S54, processing for when the length of the target edge vector equals at least 2 is performed. FIG. 31 shows the contents of the processing, a detailed description of which will be provided below. In step S55, processing for when the edge data of the target edge vector equals −1, that is, the length of the vector is 1 and the direction of the vector is leftward or upward, is performed. FIG. 30 shows the contents of the processing, a detailed description of which will be provided later. After the completion of the respective (or any of) processes of steps S53, S54 and S55, the process returns to the processing shown in FIG. 26 assuming that smoothing processing for one target edge vector has been completed.

Next, the contents of the process of step S53 shown in FIG. 28 will be described with reference to FIG. 29.

The processing of the flow shown in FIG. 29 is started by being called for in step S53 shown in FIG. 28. In step S101, it is determined whether or not the edge data of the edge vector immediately before the target edge vector (hereinafter termed immediately-preceding-edge data) equals at least 3. If the result of the determination is affirmative, the process proceeds to step S103. If the result of the determination in step S101 is negative, the process proceeds to step S102. In step S102, it is determined whether or not the immediately-preceding-edge data equals −3 or less. If the result of the determination is affirmative, the process proceeds to step S105. If the result of the determination in step S102 is negative, the process proceeds to step S110. In step S103, it is determined whether or not the edge data of the edge vector immediately after the target edge vector (hereinafter termed immediately-succeeding-edge data) equals −3 or less. If the result of the determination is affirmative, the process proceeds to processing after step S108. The processing after step S108 corresponds to the processing shown in FIG. 13. In step S104, it is determined whether or not the immediately-succeeding-edge data equals 1. If the result of the determination is affirmative, the process proceeds to step S107. If the result of the determination in step S104 is negative,. the process proceeds to step S125. Processing after step S125 corresponds to the processing shown in FIG. 22. In step S105, it is determined whether or not the immediately-succeeding-edge data equals at least 3. If the result of the determination is affirmative, the process proceeds to step S108. If the result of the determination in step S105 is negative, the process proceeds to step S106. In step S106, it is determined whether or not the immediately-succeeding-edge data equals −1. If the result of the determination is affirmative, the process proceeds to step S107. If the result of the determination in step S106 is negative, the process proceeds to step S125. In step S107, it is determined whether or not the edge data of the second edge vector after the target edge vector (hereinafter termed "second-succeeding-edge data") equals a value obtained by inverting the sign of the target edge data. If the result of the determination is affirmative, it is determined that the target edge vector corresponds to edge vector 118 shown in FIG. 11, and the process returns to the routine shown in FIG. 28 without defining a point after smoothing processing for this target edge vector. In step S108, a counter point after first smoothing processing of the target edge vector is defined by making the start point of the target edge vector to be a salient point. The contents of this processing will be described below with reference to FIG. 32. In step S109, a contour point after first smoothing processing of the target edge vector is defined by making the end point of the target edge vector to be a salient point. The contents of this processing will be described below with reference to FIG. 33. In step S110, it is determined whether or not the immediately-succeeding-edge data equals at least 3. If the result of the determination is affirmative, the process proceeds to step S114. If the result of the determination in step S110 is negative, the process proceeds to step S111. In step S111, it is determined whether or not the immediately-succeeding-edge data equals −3 or less. If the result of the determination is affirmative, the process proceeds to step S112. If the result of the determination in step S111 is negative, the process proceeds to step S115. In step S112, it is determined whether or not the immediately-preceding-edge data equals −1. If the result of the determination is affirmative, the process proceeds to step S113. If the result of the determination in step S112 is negative, the process proceeds to step S125. In step S113, it is determined whether or not the edge data of the second edge vector before the target edge vector (hereinafter termed "second-preceding-edge data") equals a value obtained by inverting the sign of the target edge data. If the result of the determination is affirmative, it is determined that the target edge vector corresponds to edge vector 111 shown in FIG. 11, and the process returns to the routine shown in FIG. 28 without defining a point after smoothing processing for this target edge vector. In step S114, it is determined whether or not the immediately-preceding-edge data equals 1. If the result of the determination is negative, the process proceeds to step S125. If the result of the determination in step S114 is affirmative, the process proceeds to step S113. In step S115, it is determined whether or not the immediately-succeeding-edge data equals 1. If the result of the determination is affirmative, the process proceeds to step S117. If the result of the determination in step S115 is negative, the process proceeds to step S116. In step S116, it is determined whether or not the immediately-succeeding-edge data equals −1. If the result of the determination is affirmative, the process proceeds to step S117. If the result of the determination in step S116 is negative, the process proceeds to step S125. In step S117, it is determined whether or not the immediately-succeeding-edge data equals a value obtained by inverting the sign of the immediately-preceding-edge data. If the result of the determination is affirmative, the process proceeds to step S118. If the result of the determination in step S117 is negative, the process proceeds to step S125. In step S118, it is determined whether or not the second-preceding-edge data equals at least 3. If the result of the determination is affirmative, the process proceeds to step S124. If the result of the detemination in step S118 is negative, the process proceeds to step S119. In step S119, it is determined whether or not the second-preceding-edge data equals the target edge data. If the result of the determination is affirmative, the process proceeds to step S120. If the result of the determination in step S119 is negative, the process proceeds to step S125. In step S120, it is determined whether or not the second-succeeding-edge data equals the target edge data. If the result of the determination is affirmative, the process proceeds to step S121. If the result of the determination in step S120 is negative, the process proceeds to step S125. In step S121, it is determined whether or not the edge data of the third edge vector before the target edge vector (hereinafter termed "third-preceding-edge data") equals the immediately-succeeding-edge data. If the result of the determination is affirmative, the process proceeds to step S122. If the result of the determination in step S121 is negative, the process proceeds to step S125. In step S122, it is determined whether or not the edge data of the third vector after the target edge vector (hereinafter termed "third-succeeding-edge data") equals the immediately-preceding-edge data. If the result of the determination is affirmative, the process proceeds to step S123. If the result of the determination in step S122 is negative, the process proceeds to step S125. In the case to be processed in step S123, the target edge vector corresponds to edge vector 120 shown in FIG. 12, and processing of removing consecutive notches is performed. Thereafter, the process returns to the routine shown in FIG. 28. The contents of the process of step S123 will be described below with reference to FIG. 35. In step S124, it is determined whether or not the second-succeeding-edge data equals at least 3. If the result of the determination is affirmative, it is determined that the target edge vector corresponds to vector 110 or 115 shown in FIG. 11, and the process returns to the routine shown in FIG. 28 without defining a point after smoothing processing for the target edge vector. Processing in step S125 corresponds to the processing shown in FIG. 22. The contents of this processing will be described below with reference to FIG. 34. The processing performed when the target edge data equals 1 has now been described with reference to FIG. 29.

Processing performed when the target edge data equals −1 is shown in the flowchart of FIG. 30. The processing of the flow shown in FIG. 30 is started by being called for in step S55 shown in FIG. 28. The flow shown in FIG. 30 has the same structure as the flow shown in FIG. 29. In FIG. 30, step numbers S101, etc., of respective process steps shown in FIG. 29 are replaced by step numbers S201, etc., preserving numbers after the order of 10 (the last two digits). The flow shown in FIG. 30 differs from the flow shown in FIG. 29 in that the directions of the signs of inequality of steps S218 and S224 are inverted from those of steps S118 and S124. The two flows are entirely the same in other items. This is because the signs of the corresponding target edge data in the two flows are different from each other, but the edge patterns being checked are entirely the same. Accordingly, the description of the contents of the flow shown in FIG. 29 also holds for the flow shown in FIG. 30, and a detailed description of the flow shown in FIG. 30 will therefore be omitted.

Processing performed when the length of the target edge vector equals at least 2 is shown in the flowchart of FIG. 31. The processing of the flow shown in FIG. 30 is started by being called for in step S54 shown in FIG. 28. In step S301, it is determined whether or not the target edge data equals 2. If the result of the determination is affirmative, the process proceeds to step S303. If the result of the determination in step S301 is negative, the process proceeds to step S302. In step S302, it is determined whether or not the target edge data equals −2. If the result of the determination is affirmative, the process proceeds to step S303. If the result of the determination in step S302 is negative, the process proceeds to step S307. In step S303, it is determined whether or not the immediately-preceding-edge data equals 2. If the result of the determination is affirmative, the process proceeds to step S333. If the result of the determination in step S303 is negative, the process proceeds to step S304. In step S304, it is determined whether or not the immediately-preceding-edge data equals −2. If the result of the determination is affirmative, the process proceeds to step S333. If the result of the determination in step S304 is negative, the process proceeds to step S305. In step S305, it is determined whether or not the immediately-succeedding-edge data equals 2. If the result of the determination is affirmative, the process proceeds to step S333. If the result of the determination in step S305 is negative, the process proceeds to step S306. In step S306, it is determined whether or not the immediately-succeeding-edge data equals −2. If the result of the determination is affirmative, the process proceeds to step S333. If the result of the determination in step S306 is negative, the process proceeds to step S307. In step S307, it is determined whether or not the immediately-preceding-edge data equals 1. If the result of the determination is affirmative, the process proceeds to step S313. If the result of the determination in step S307 is negative, the process proceeds to step S308. In step S308, it is determined whether or not the immediately-preceding-edge data equals −1. If the result of the determination is affirmative, the process proceeds to step S313. If the result of the determination in step S308 is negative, the process proceeds to step S309. In step S309, it is determined whether or not the immediately-succeeding-edge data equals 1. If the result of the determination is affirmative, the process proceeds to step S331. If the result of the determination in step S309 is negative, the process proceeds to step S310. In step S310, it is determined whether or not the immediately-succeeding-edge data equals −1. If the result of the determination is affirmative, the process proceeds to step S331. If the result of the determination in step S310 is negative, the process proceeds to step S311. In step S311, it is determined whether or not the target edge data equals at least 3. If the result of the determination is affirmative, the process proceeds to step S329. If the result of the determination in step S311 is negative, the process proceeds to step S312. In step S312, it is determined whether or not the target edge data equals −3 or less. If the result of the determination is affirmative, the process proceeds to step S329. If the result of the determination in step S312 is negative, the process proceeds to step S328. In step S313, it is determined whether or not the immediately-succeeding-edge data equals at least 2. If the result of the determination is affirmative, the process proceeds to step S324. If the result of the determination in step S313 is negative, the process proceeds to step S315. In step S315, it is determined whether or not the immediately-succeeding-edge data equals a value obtained by inverting the sign of the immediately-preceding-edge data. If the result of the determination is affirmative, the process proceeds to step S316. If the result of the determination in step S315 is negative, the process proceeds to step S317. In step S316, it is determined whether or not the length of the target edge vector is greater than the sum of the length of the second edge vector before the target edge vector and the length of the second edge vector after the target edge vector. If the result of the determination is affirmative, the process proceeds to step S326. If the result of the determination in step S316 is negative, the process proceeds to step S328. In step S317, it is determined whether or not the sign of the second-preceding-edge data is the same as the sign of the the target edge data. If the result of the determination is affirmative, the process proceeds to step S318. If the result of the determination in step S317 is negative, the process proceeds to step S321. The case to be processed in step S318 corresponds to the rule described with reference to FIG. 15 or 17, and the target edge vector corresponds to vector $D_i$ shown in FIG. 15 or 17. In step S318, a contour point after first smoothing processing is defined by the midpoint of the target edge vector. The contents of this processing will be described below with reference to FIG. 32. In step S319, it is determined whether or not the sign of the second-succeeding-edge data is the same as the sign of the target edge data. The case in which the result of the determination is affirmative corresponds to the rule shown FIG. 15, and the process returns to the original routine. The case in which the result of the determination in step S319 is negative corresponds to the rule shown in FIG. 17, and the process proceeds to step S320. In step S320, a contour point after first smoothing processing is defined by making the end point of the target edge vector to be a salient point, and the process returns to the original routine. The contents of the salient-point processing for the end point will be described below with reference to FIG. 33. The case to be processed in step 321 corresponds to the rule shown in FIG. 16 or 18, that is, the processing performed when the target edge vector corresponds to edge vector $D_i$ shown in FIG. 16 or 18. In step S321, a contour point after first smoothing processing is defined by making the start point of the target edge vector to be a salient point. The contents of the salient-point processing for the start point will be described later with reference to FIG. 32. The process then proceeds to step S322. In step S322, it is determined whether or not the sign of the second-succeeding-edge data is the same as the sign of the target edge vector. The case in which the result of the determination is affirmative corresponds to the rule shown in FIG. 16, and the process proceeds to step S323. The case in which the result of the determination in step S322 is negative corresponds to the rule shown in FIG. 18, and the process proceeds to step S320. In step S323, a contour point after first smoothing processing is defined by the midpoint of the target edge vector, and the process returns to the original routine. The cases to be processed in steps S324 and S325 correspond to the rule shown in FIG. 19, and the target edge vector corresponds to edge vector $D_i$ shown in FIG. 19. In step S324, a point obtained by moving from the start point toward the end point of the target edge vector by the length of the second edge vector before the target edge vector is defined as a contour point after first smoothing processing. In step S325, a contour point after first smoothing processing is defined by making the end point of the target edge vector to be a salient point. Thereafter the process returns to the original routine. The contents of the process of step S324 will be described below with reference to FIG. 36, and the contents of the process of step S325 will be described below with reference to FIG. 33. The cases to be processed in steps S326 and S327 correspond to the rule shown in FIG. 24, and the target edge vector corresponds to edge vector $D_i$ shown in FIG. 24. Processing in step S326 is the same as the processing in step S324. In step S327, a point obtained by returning from the end point toward the start point of the target edge vector by the length of the second edge vector after the target edge vector is defined as a contour point after first smoothing processing. The contents of the process of step S327 will be described below with reference to FIG. 37. After the completion of the process of step S327, the process returns to the original routine. The case to be processed in step S328 does not correspond to any of the rules shown in FIGS. 10 through 24. After performing midpoint processing, which will be described below with reference to FIG. 34, in step S328, the process returns to the original routine.

Figure 32:
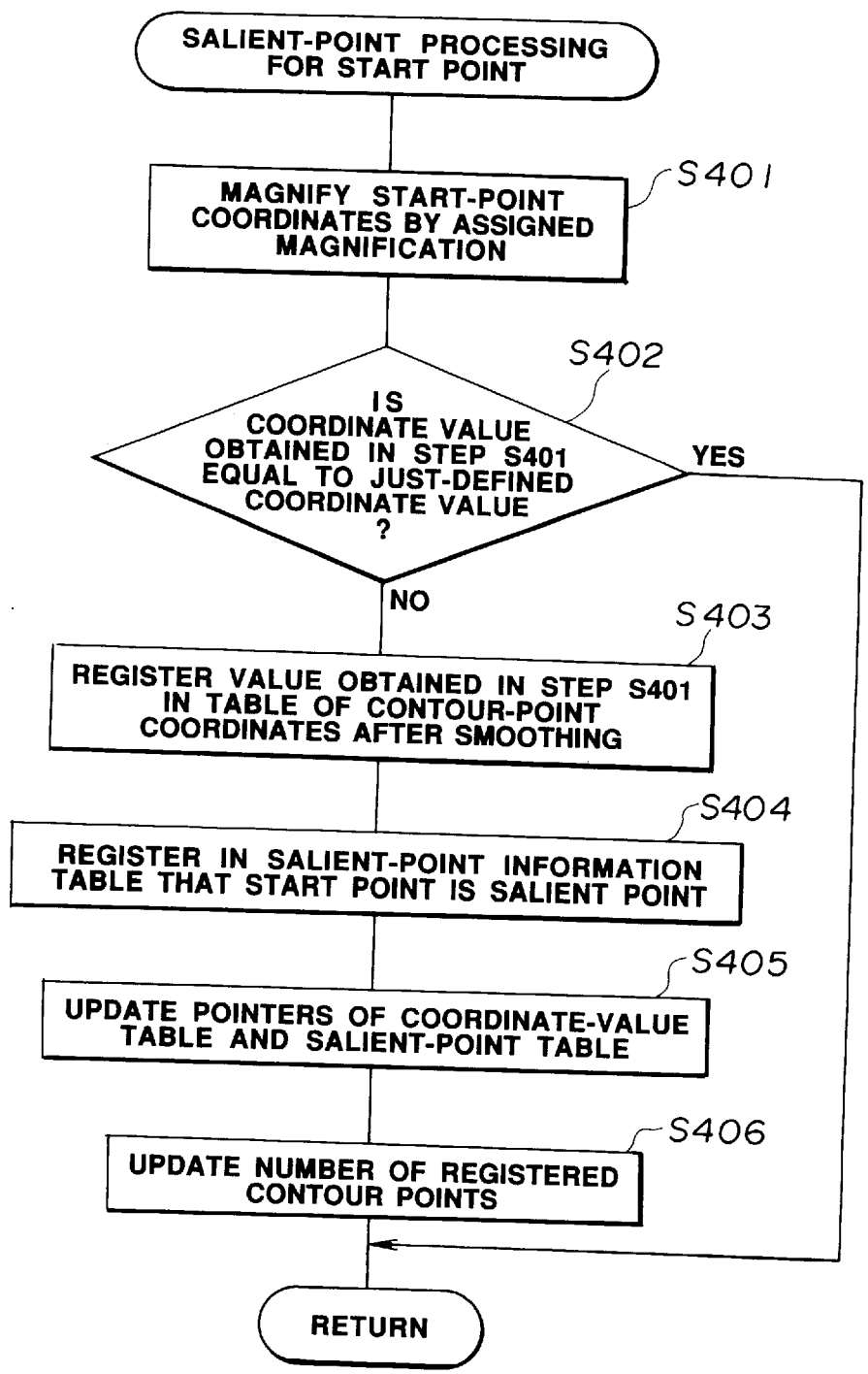
Figure 33:
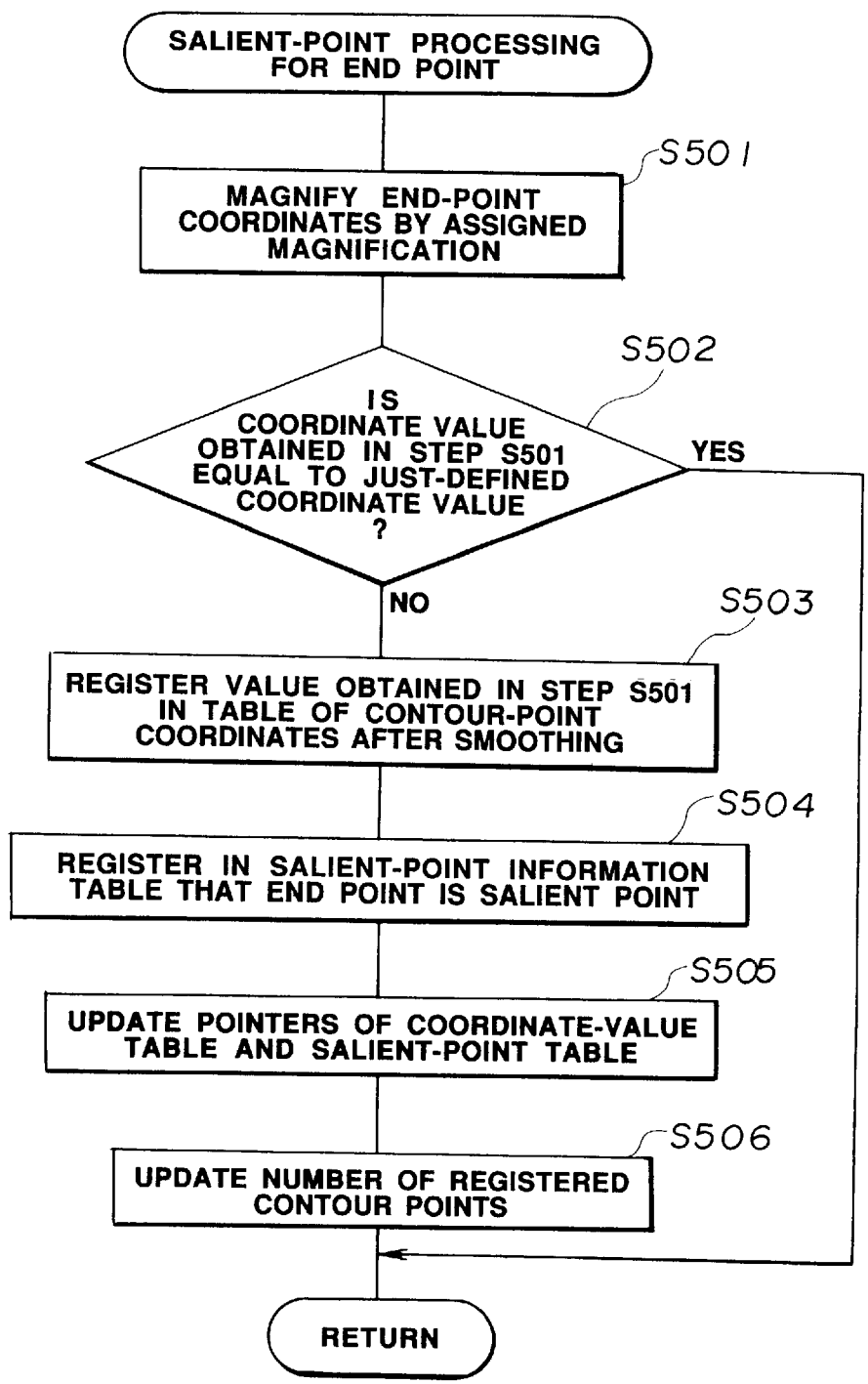
Figure 34:
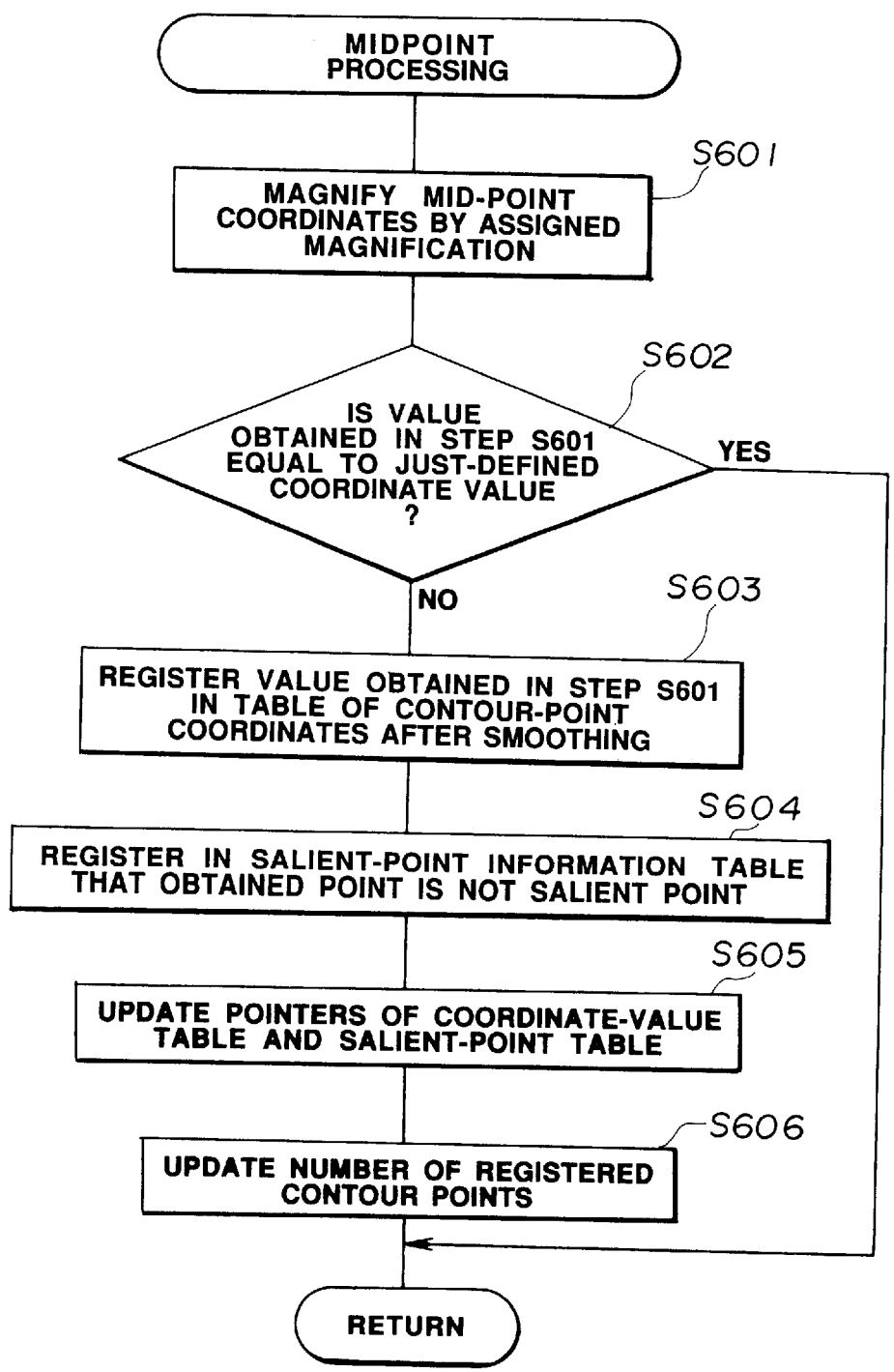
Figure 37:
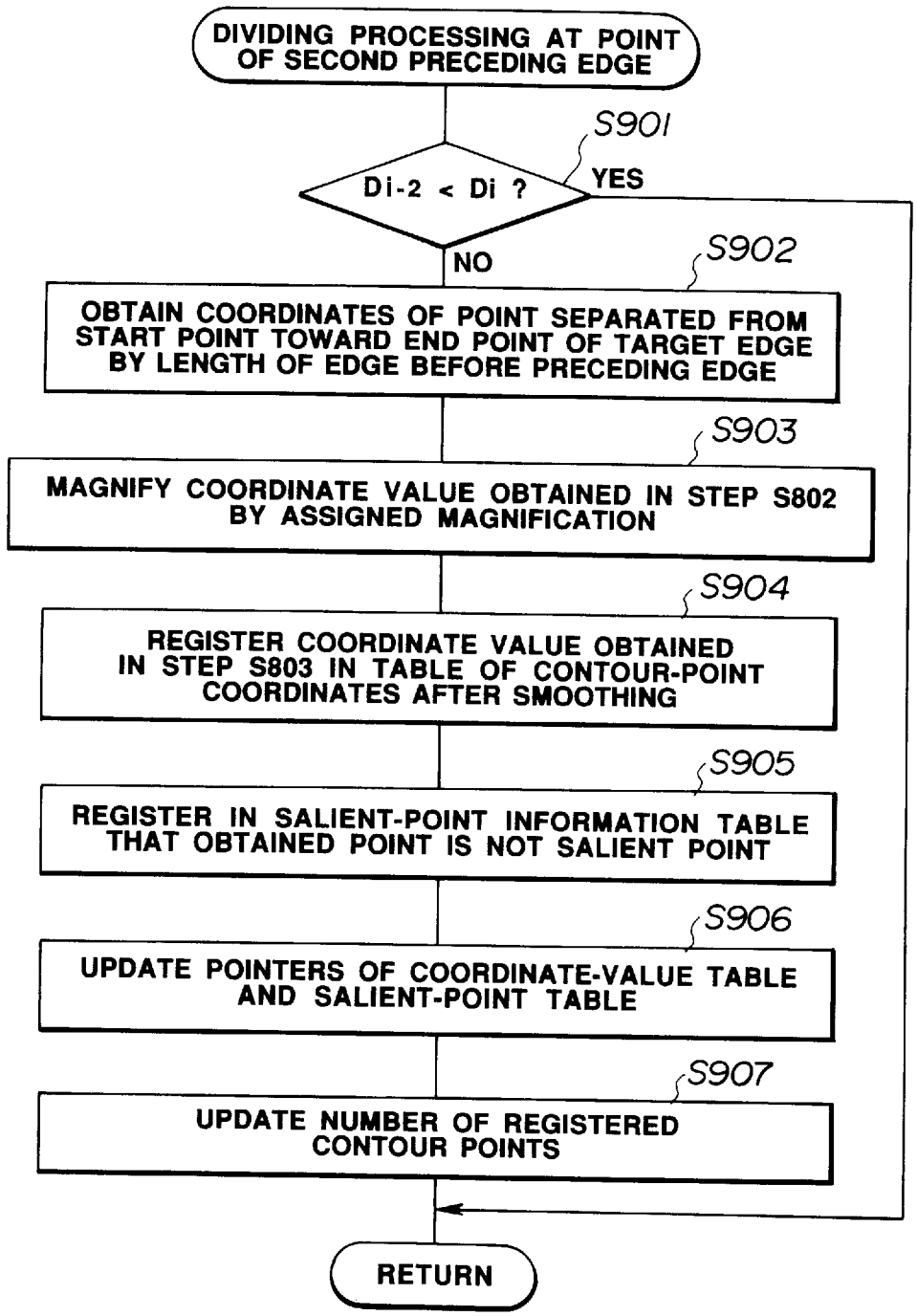

The cases to be processed in steps S329 and S330 correspond to the rule shown in FIG. 21, and the target edge vector corresponds to edge vector $D_i$ shown in FIG. 21. In step S329, salient-point processing for the start point of the target edge vector, which will be described later with reference to FIG. 32, is performed. In step S330, salient-point processing for the end point of the target edge vector, which will be described later with reference to FIG. 33, is performed. Thereafter the process returns to the original routine. The cases to be processed in steps S331 and S332 correspond to the rule shown in FIG. 20. In step S331, salient-point processing for the start point of the target edge vector, which will be described later with reference to FIG. 37, is performed. In step S332, dividing processing at the point of the second edge vector after the target edge vector, which will be described later with reference to FIG. 37, is performed. Thereafter the process returns to the original routine. The case to be processed in step S333 corresponds to the rule shown in FIG. 23. In step S333, midpoint processing, which will be described below with reference to FIG. 34, is performed. Thereafter the process returns to the original routine. The processing performed when the length of the target edge vector equals at least 2 has now been described.

The salient-point processing for the start point of the target edge vector will now be described with reference to FIG. 32. In step S401, the coordinate value obtained by magnifying the coordinate values (the x-coordinate value and the y-coordinate value) of the start point of the target edge vector by magnifications (independent for the main-scanning direction and the sub-scanning direction) assigned by magnification setting means 31 are calculated. In step S402, it is determined whether or not the coordinate values calculated in step S401 equal the just-defined coordinate values (both the x-coordinate value and the y-coodinate value). If the result of the determination is affirmative, the process returns to the original routine, since the corresponding position has already been defined as a contour point. If the result of the determination in step S402 is negative, the process proceeds to step S403. In step S403, the calculated coordinate values are registered in the storage region for contour-point data after first smoothing processing secured in working memory region 76. In step S404, data indicating that the point is a salient point is registered in the additional data region also secured in working memory region 76. These data regions are secured as continuous regions having a sufficient capacity, and are controlled by pointers. In step S405, the address values of the data regions are incremented by the amount of one data in order to move the pointers of the storage region for contour point coordinate data and the additional data region to the storage position for the next data. In step S21 shown in FIG. 25, the data region for storing the number of contour points after first smoothing processing registered during the processing is secured for the number of coarse contour loops in working memory region 76, and is initialized to 0. This data region includes a region for storing the number of processed contour points for the target coarse contour loop at that time. In step S406, the number of processed contour points for the corresponding loop is incremented by one. After the completion of the process in step S406, the process returns to the original routine.

Next, the salient-point processing for the end point of the target edge vector will be described with reference to FIG. 33. The flow shown in FIG. 33 has the same structure as the flow shown in FIG. 32. In FIG. 33, step numbers S401, etc., of respective process steps shown in FIG. 32 are replaced by step numbers S501, etc., preserving numbers after the order of 10 (the last two digits). The flow shown in FIG. 33 differs from the flow shown in FIG. 32 in that the process of step S501 is performed with replacing the start point in step S401 by the end point. The two flows are entirely the same in other items, and therefore a description of the flow of FIG. 33 will be omitted.

Next, a description will be provided of the midpoint processing with reference to FIG. 34. The flow shown in FIG. 34 also has the same structure as the flow shown in FIG. 32. In FIG. 34, step numbers S401, etc., of respective process steps shown in FIG. 32 are replaced by step numbers S601, etc., preserving numbers after the order of 10 (the last two digits). Steps S601 and S604 shown in the flow of FIG. 34 differ from steps S401 and S404 shown in the flow of FIG. 32, respectively, but the flow of FIG. 34 is the same as the flow of FIG. 32 in other items. Accordingly, a description will be provided of only steps S601 and S604, and a description of other steps will be omitted. In step S601, the coordinate value of the midpoint of the start point and the end point of the target edge vector magnified by an assigned magnification is calculated. In step S604, the obtained point is registered as a non-salient point in a salient-point information table.

Figure 35:
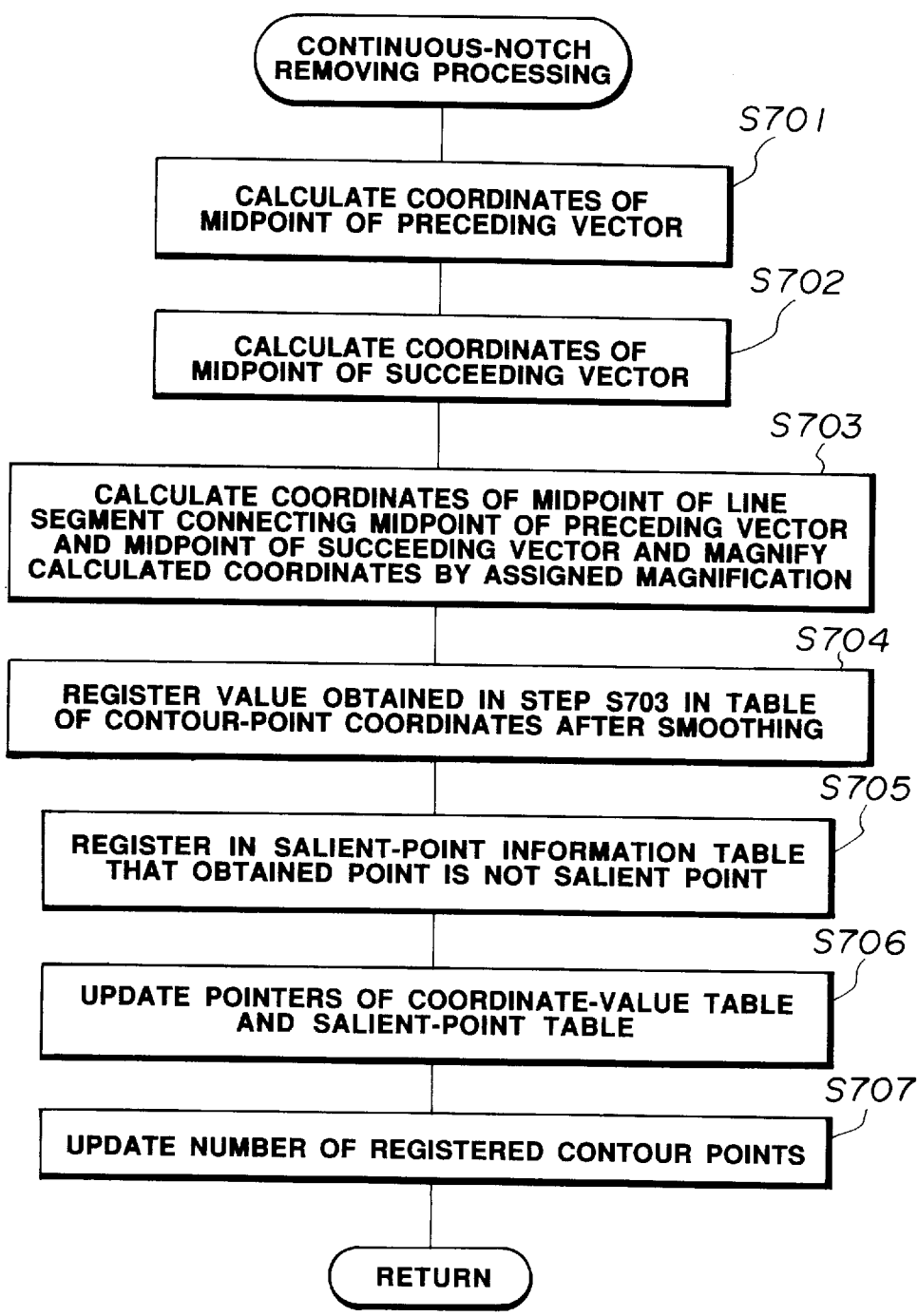

Next, a description will be provided of the consecutive-notch removing processing with reference to FIG. 35. In step S701, the coordinates of the midpoint of the start point and the end point of the immediately preceding edge vector are calculated. In step S702, the coordinates of the midpoint of the start point and the end point of the immediately succeeding edge vector are calculated. In step S703, the coordinates of the midpoint of the line segment connecting the above-described midpoints are calculated from the coordinate values obtained in steps S701 and S702. Steps S704 through S707 are the same as steps S603 through S606.

Figure 36:
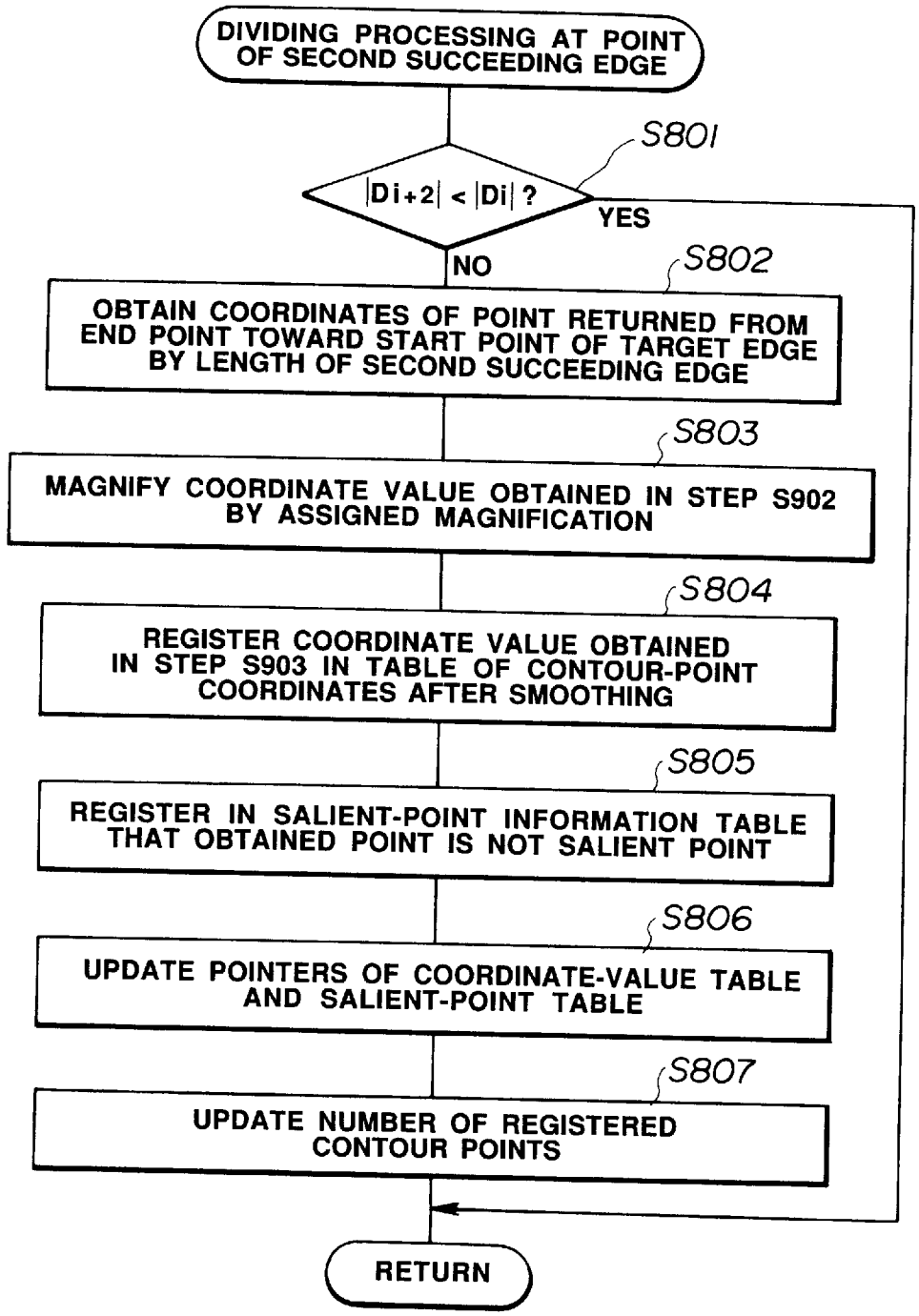

Next, a description will be provided of the dividing processing at the point of the second edge vector before the target edge vector with reference to FIG. 36. In step S801, it is determined whether or not the length of the target edge vector is greater than the length of the second edge vector before the target edge vector. If the result of the determination is affirmative, the process proceeds to step S802. If the result of the determination in step S801 is negative, the process returns to the original routine. In step S802, the coordinate value of a point separated from the start point toward the end point of the target edge vector by the length of the second edge vector before the target edge vector is obtained. In step S803, the coordinate value obtained in step S802 magnified by an assigned magnification is calculated. Steps S804 through S807 are the same as steps S603 through S606.

Next, a description will be provided of the dividing processing at the point of the second edge vector after the target edge vector with reference to FIG. 37. In step S901, it is determined whether or not the length of the target edge vector is greater than the length of the second edge vector after the target edge vector. If the result of the determination is affirmative, the process proceeds to step S902. If the result of the determination in step S901 is negative, the process returns to the original routine. In step S902, the coordinate value of a point returned from the end point toward the start point of the target edge vector by the length of the second edge vector after the target edge vector is calculated. Steps S903 through S907 are the same as steps S803 through S807.

Figure 38:
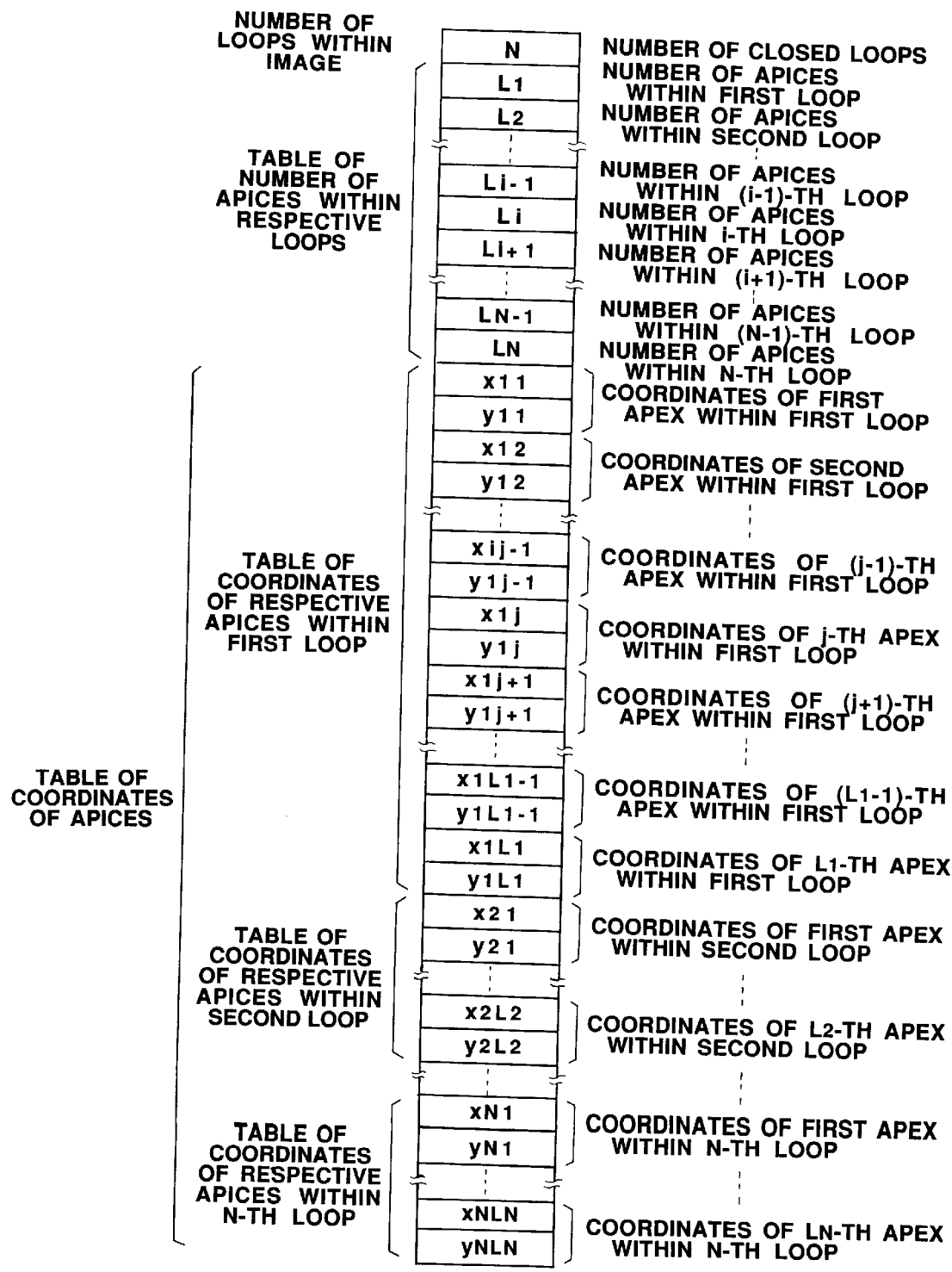
FIG. 38 is a diagram illustrating contour data after second smoothing processing.

The contents of the first smoothing processing have now been described. Data after first smoothing processing are stored in RAM region 76. After thus completing the process of step S2, CPU 71 performs second smoothing processing in step S3. In the second smoothing processing, data after first smoothing processing are input. That is, the number of closed loops, the number of contour points within each closed loop, the data string of the coordinate values of contour points after performing first smoothing processing for each closed loop, and the data string of additional information for contour points after first smoothing processing for each closed loop are input, and contour-point data after second smoothing processing are output. As shown in FIG. 38, contour data after second smoothing processing comprise the number of closed loops, a table of contour points within respective closed loops, and the data string of the coordinate values of contour points after second smoothing processing within respective closed loops.

Figure 39:
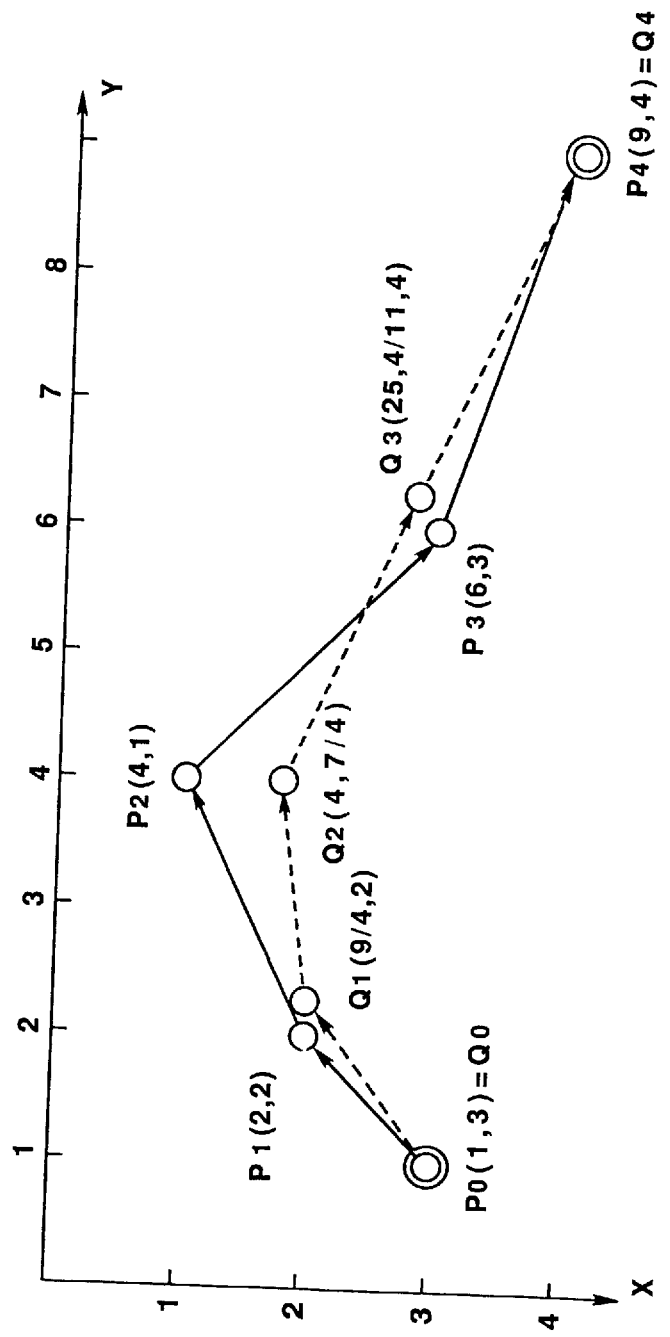
FIG. 39 is a diagram illustrating second smoothing processing.

A description will now be provided of second smoothing processing with reference to FIG. 39. As in first smoothing processing, second smoothing processing is performed in units of a contour loop, and for each contour point within each contour loop.

If the target contour point is a salient point, the coordinate value itself of the input contour point is made to be coordinate data of a contour point after second smoothing processing for the target contour point. If the target contour point is a non-salient point, the value of the weighted mean of the coordinate value of the contour points immediately before and after the target contour point and the coordinate value of the target contour point is made to be the coordinate value of a contour point after second smoothing processing for the target contour point. That is, if the coordinate value of the target input contour point which is a non-salient point is represented by $P_i(x_i, y_i)$, the contour point immediately before the target contour point is is represented by $P_{i-1}(x_{i-1}, y_{i-1})$, the contour point immediately after the target contour point is represented by $P_{i+1}(x_{i+1}, y_{i+1})$, and a contour point after second smoothing processing for the target point is represented by $Q_i(x_i', y_i')$, the values $x_i'$ and $y_i'$ are calculated by:

$$x_i' = k_{i-1} \cdot x_{i-1} + k_i \cdot x_i + k_{i+1} \cdot x_{i+1}$$

$$y_i' = k_{i-1} \cdot y_{i-1} + k_i \cdot y_i + k_{i+1} \cdot y_{i+1} \qquad (1),$$

where $k_{i-1} = k_{i+1} = 1/4$, and $k_i = 1/2$.

In FIG. 39, points $P_0, P_1, P_2, P_3$ and $P_4$ are part of an input consecutive contour point string after first smoothing processing, where the points $P_0$ and $P_4$ are salient points, and the points $P_1, P_2$ and $P_3$ are non-salient points. The result of processing at that time is represented by points $Q_0, Q_1, Q_2, Q_3$ and $Q_4$. Since the points $P_0$ and $P_4$ are salient points, the coordinate values themselves of these points become the coordinate values of the points $Q_0$ and $Q_4$. The point $Q_1$ has a coordinate value calculated from the points $P_0, P_1$ and $P_2$ using expression (1). In the same manner, the points $Q_2$ and $Q_3$ have coordinate values calculated from the points $P_1, P_2$ and $P_3$, and the points $P_2, P_3$ and $P_4$ using expression (1), respectively.

CPU 71 executes such processing for contour data after first smoothing processing stored in RAM region 76. The processing is performed for each loop in the order of the first loop, the second loop, the third loop and so on. By completing the processing for all the loops, the second smoothing processing is completed. In the processing of each loop, processing is performed for each point in the order of the first point, the second point, the third point and so on. By completing the processing for all contour points within the corresponding loop using expression (1), the processing for the loop is completed, and the processing for the next loop is then started. When L contour points are present within the corresponding loop, the point immediately preceding the first point corresponds to the L-th point, and the point immediately succeeding the L-th point corresponds to the first point. As described above, in the second smoothing processing, the total number of loops and the number of contour points within each loop are the same as in input contour data after first smoothing processing, and the same number of contour-point data are generated. CPU 72 outputs the above-described results in RAM region 76 or disk device 72 in the form illustrated in FIG. 38, and terminates the second smoothing processing of step S3.

The process then proceeds to step S4, where CPU 71 transfers data obtained by the second smoothing processing to binary-image reproducing means 4 via I/O 75, and a series of processes shown in FIG. 8 are completed.

Binary-image reproducing means 4 may, for example, comprise a device described in the patent applied by the assignee of the present application (Japanese Patent Application No. 3-172098 (1991)). According to the device, based on contour data after second smoothing processing transferred via an I/O, a binary image generated by painting a region surrounded by a vector diagram represented by the contour data can be output in the form of raster scanning. The image can also be visualized using binary-image output means, such as a video printer or the like.

SECOND EMBODIMENT

In the above-described embodiment, magnification-varying processing of an outline is simultaneously performed while performing first smoothing processing. However, magnification-varying processing may not be performed while performing first smoothing processing, but may be performed while performing second smoothing processing. Alternatively, only magnification-varing processing may, of course, be performed after the completion of first smoothing processing, and second smoothing processing may be performed after the completion of magnification-varying processing for all contour data. The magnification-varying processing can be easily performed by magnifying contour data before the magnification-varying processing by a magnification obtained by magnification setting means. Magnification-varying processing may, of course, be performed after the completion of second smoothing processing.

THIRD EMBODIMENT

In the first embodiment, weighting coefficients $k_{i-1}$, $k_i$ and $k_{i+1}$ used during second smoothing processing have the following relationship:

$$k_{i-1}=k_{i+1}=¼, \text{ and } k_i=½.$$

However, the coefficients may, of course, have any other appropriate relationship, for example, $$k_{i-1}=k_{i+1}=⅛, \text{ and } k_i=¾.$$

FOURTH EMBODIMENT

In the first embodiment, in the state of the processing pattern of removing consecutive notches shown in FIG. 12, a point after first smoothing processing may not be defined for the target edge vector at that time. In such a case, the processing speed can be increased further. This rule can be realized if in the first embodiment the processes proceed to the next steps with performing no processing in step S123 in the flow of processing 11 shown in FIG. 29 and in step S223 in the flow of processing 12 shown in FIG. 30.

FIFTH EMBODIMENT

In the first embodiment, the binary-image reproducing means may comprise a device described in a patent application filed by the assignee of the present application (Japanese Patent Application No. 3-172097 (1991) or 3-172099 (1991)).

SIXTH EMBODIMENT

In the first embodiment, the binary-image output means comprises a video printer. However, the binary-image output means in the present invention is not limited to such a device, but may comprise, for example, a display unit, or transmission means for transmitting a signal to an external communication channel.

SEVENTH EMBODIMENT

The binary-image acquisition means in the first embodiment may comprise reception means for receiving a signal from an external communication channel.

As described above, according to the present invention, outline vectors are extracted from a binary image, smoothing and magnification-varying processing is performed in the state of expression by the extracted outline vectors, and a binary image is reproduced from the outline vectors subjected to the smoothing and magnification-varying processing. It is thereby possible to obtain an image having high picture quality which is magnified by arbitrary magnifications independently in the main-scanning direction and the sub-scanning direction.

The present invention also has the advantage of being capable of performing high-speed processing while reducing the amount of calculation compared with a conventional approach, by adopting a method of determining outline vectors after smoothing processing in accordance with a pattern of a target outline vector and outline vectors surrounding the target outline vector. Moreover, by introducing three kinds of rules even for a fine structure having a one-dot width such that whether the structure must be removed as noise, must be preserved as a salient point without performing smoothing processing, or must be made to be a point on a smooth contour by performing smoothing processing, it is possible to perform high-quality outline-vector processing even for contour vectors obtained from an image having a complicated structure including noise generated when a line drawing such as a weather chart, a business document or the like is read by an image reader or the like.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image processing apparatus, comprising:

inputting means for inputting first image data;

extraction means for extracting outline-vector data indicating an outline of the first image data inputted by said input means;

first smoothing means for smoothing the outline-vector data extracted by said extraction means in order to remove noise;

means for performing magnification-varying processing of the outline-vector data smoothed by said first smoothing means;

second smoothing means for smoothing the outline-vector data varied by said varying means in order to smooth an outline;

means for generating second image data in accordance with the outline-vector data smoothed by said second smoothing means; and means for outputting the second image data generated by said generation means.

2. An apparatus according to claim 1, further comprising means for setting varying magnifications independently in a main-scanning direction and a sub-scanning direction.

3. An apparatus according to claim 2, wherein the respective magnifications set independently in the main-scanning direction and the sub-scanning direction have arbitrary values.

4. An apparatus according to claim 1, further comprising means for setting a varying magnification to an arbitrary value.

5. An apparatus according to claim 1, wherein said extraction means for extracting the outline-vector data performs extraction in accordance with part of the first image data inputted by said inputting means in parallel with the input of the first image data in a raster scanning format by said inputting means.

6. An apparatus according to claim 1, wherein said extraction means for extracting the outline-vector data performs extraction for indicating a boundary of white pixel and black pixel existing between a white pixel area and a black pixel area of the image data inputted by said input means.

7. An apparatus according to claim 1, wherein said first smoothing means outputs additional information for a coordinate value corresponding to a salient point of the outline-vector data, and wherein said second smoothing means does not perform smoothing on said coordinate value, based on the additional information.

8. An apparatus according to claim 1, wherein the noise is an isolated point.

9. An apparatus according to claim 1, wherein the noise is consecutive notches.

10. An apparatus according to claim 1, wherein said means for outputting is a printer.

11. An apparatus according to claim 1, wherein said means for outputting is a display apparatus.

12. An apparatus according to claim 1, wherein the first image data is image data read by an image reader.

13. An image processing method, comprising the steps of:

inputting first image data;

extracting outline-vector data for indicating an outline of the first image data inputted in said inputting step;

performing a first smoothing step of smoothing the outline-vector data extracted in said extracting step in order to remove noise;

performing magnification-varying processing of the outline-vector data smoothed in said first smoothing step;

performing a second step of smoothing the outline-vector data varied by said varying step in order to smooth an outline;

generating second image data in accordance with the outline-vector data smoothed by said second smoothing step; and outputting the second image data generated by said generating step.

14. A method according to claim 13, further comprising the step of setting varying magnifications independently in a main-scanning direction and a sub-scanning direction.

15. A method according to claim 14, wherein the respective magnifications set independently in the main-scanning direction and the sub-scanning direction have arbitrary values.

16. A method according to claim 13, further comprising the step of setting a varying magnification to an arbitrary value.

17. A method according to claim 13, wherein, in the step of extracting the outline-vector data, extraction is performed in accordance with part of the first image data inputted by said inputting step in parallel with the step of inputting the first image data in a raster scanning format.

18. A method according to claim 13, wherein, in the step of extracting the outline-vector data, extraction is performed for indicating a boundary of white pixel and black pixel existing between a white pixel area and a black pixel area of the image data inputted by said inputting step.

19. A method according to claim 13, wherein additional information for a coordinate value corresponding to a salient point of the outline-vector data is outputted in said first smoothing step, and wherein the coordinate value is not subjected to smoothing processing in said second smoothing step, based on the additional information.

20. An image processing method, comprising the steps of:

inputting image data;

extracting outline-vector data indicating an outline of the image data inputted in said inputting step;

smoothing the outline-vector data extracted in said extracting step;

performing magnification-varying processing of the outline-vector data smoothed in said smoothing step;

generating image data in accordance with the outline-vector data varied in said varying step; and outputting the image data generated in said generating step.

21. An image processing apparatus, comprising:

means for inputting image data;

means for extracting outline-vector data indicating an outline of the image data inputted by said inputting means;

means for smoothing the outline-vector data extracted by said extracting means;

means for performing magnification-varying processing of the outline-vector data smoothed by said smoothing means;

means for generating image data in accordance with the outline-rector data varied by said magnification-varying means; and means for outputting the image data generated by said generation means.

* * * * *

UNITED STATES PATENT AND TRADEMARK OFFICE
CERTIFICATE OF CORRECTION

PATENT NO.   : 5,878,161

DATED        : March 2, 1999

INVENTOR(S)  : YOSHIHIRO ISHIDA, ET AL.

It is certified that error appears in the above-identified patent and that said Letters Patent is hereby corrected as shown below:

AT [56] REFERENCES CITED

FOREIGN PATENT DOCUMENTS

"3215893" should read --3-215893--.

COLUMN 1

Line 63, "Gazo" should read --*Gazo*--.

COLUMN 3

Line 6, "magnification-varing" should read --magnification-varying--;
Line 16, "FIG. 2" should read --FIGS. 2--;
Line 26, "smoothing/magnifiation-vaying" should read --smoothing/magnification-varying--; and
Line 48, "most properly" should be deleted.

COLUMN 6

Line 33, "coutour" should read --contour--; and
Line 67, "Also" should read --Also,--.

UNITED STATES PATENT AND TRADEMARK OFFICE
CERTIFICATE OF CORRECTION

PATENT NO. : 5,878,161

DATED : March 2, 1999

INVENTOR(S) : YOSHIHIRO ISHIDA, ET AL.

It is certified that error appears in the above-identified patent and that said Letters Patent is hereby corrected as shown below:

COLUMN 11

Line 1, "vector-and" should read --vector and--.

COLUMN 14

Line 16, "descrived" should read --described--.

COLUMN 17

Line 36, "immediately-succeedding-edge" should read --immediately-succeeding-edge--.

COLUMN 18

Line 47, "step 321" should read --step S321--.

COLUMN 21

Line 61, "is is" should read --is--.

UNITED STATES PATENT AND TRADEMARK OFFICE
CERTIFICATE OF CORRECTION

PATENT NO.   :  5,878,161

DATED        :  March 2, 1999

INVENTOR(S)  :  YOSHIHIRO ISHIDA, ET AL.

It is certified that error appears in the above-identified patent and that said Letters Patent is hereby corrected as shown below:

COLUMN 22

Line 37, "CPU 72" should read --CPU 71--; and
    Line 63, "magnification-varing" should read --magnification-varying--.

COLUMN 23

Line 17, "example," should read --example:--.

COLUMN 24

Line 26, "input" should read --inputting--; and
    Line 62, "input" should read --inputting--.

UNITED STATES PATENT AND TRADEMARK OFFICE
CERTIFICATE OF CORRECTION

PATENT NO.   : 5,878,161

DATED        : March 2, 1999

INVENTOR(S)  : YOSHIHIRO ISHIDA, ET AL.

It is certified that error appears in the above-identified patent and that said Letters Patent is hereby corrected as shown below:

COLUMN 26

Line 39, "outline-rector" should read --outline-vector--.

Signed and Sealed this

Fourteenth Day of December, 1999

Attest:

Q. TODD DICKINSON

*Attesting Officer*     *Acting Commissioner of Patents and Trademarks*